US012011896B2

(12) United States Patent
Skelton et al.

(10) Patent No.: US 12,011,896 B2
(45) Date of Patent: Jun. 18, 2024

(54) DISPENSERS

(71) Applicant: Multi Packaging Solutions UK Limited, Nottingham (GB)

(72) Inventors: James J. Skelton, Nottingham (GB); David Yates, Chain Bar (GB)

(73) Assignee: Multi Packaging Solutions UK Limited (GB)

( * ) Notice: Subject to any disclaimer, the term of this patent is extended or adjusted under 35 U.S.C. 154(b) by 0 days.

(21) Appl. No.: 17/484,877

(22) Filed: Sep. 24, 2021

(65) Prior Publication Data

US 2022/0097335 A1 Mar. 31, 2022

(30) Foreign Application Priority Data

Sep. 25, 2020 (GB) .................................... 2015162

(51) Int. Cl.
*B31B 50/28* (2017.01)
*A45D 40/04* (2006.01)
(Continued)

(52) U.S. Cl.
CPC .............. *B31B 50/28* (2017.08); *A45D 40/04* (2013.01); *A45D 40/16* (2013.01); *B31B 50/62* (2017.08); *B31B 2100/0022* (2017.08)

(58) Field of Classification Search
None
See application file for complete search history.

(56) References Cited

U.S. PATENT DOCUMENTS

| | | | | | |
|---|---|---|---|---|---|
| 2,368,044 | A * | 1/1945 | Seager | A45D 40/06 401/61 |
| 2007/0104531 | A1 * | 5/2007 | Thiebaut | A45D 40/04 401/68 |

(Continued)

FOREIGN PATENT DOCUMENTS

| | | |
|---|---|---|
| EP | 0178188 | 4/1986 |
| GB | 844700 | 8/1960 |
| JP | 2001-275747 A2 | 10/2001 |

*Primary Examiner* — Tanzim Imam
(74) *Attorney, Agent, or Firm* — Brian J. Goldberg; Rohini K. Garg

(57) ABSTRACT

A method of manufacturing a dispenser for a product in stick form (50). The dispenser includes an inner tube (12) and a product concealing tube (16) disposed outwardly of the inner tube (12). The product concealing tube (16) is retractable and extendable relative to the inner tube (12) for exposing and covering a product stick (50) extending from a distal end of the inner tube (12) in use. The method includes: providing a first blank of sheet material for providing the inner tube (12) of the dispenser; wrapping the first blank around a mandrel to provide the inner tube (12) of the dispenser; and providing a second blank of sheet material for providing the product concealing tube (16) of the dispenser. The second blank comprises a slot, and a guide element (38) disposed within the slot. The method also includes: applying a bonding agent to the second blank in a region corresponding to a surface of the guide element (38); and wrapping the second blank around the inner tube (12) while the inner tube (12) is held on a mandrel to provide the product concealing tube (16), with the surface of the guide element (38) to which bonding agent has been applied facing the inner tube (12), such that the guide element (38) becomes bonded to an exterior surface of the inner tube (12). The slot provides a recess (24) in the interior surface of the formed product concealing tube (16). In use, the product concealing tube (Continued)

(16) is movable relative to the inner tube (12) with the guide element (38) cooperating with the recess (24) for guiding the movement of the product concealing tube (16) relative to the inner tube (12). There is also provided a dispenser for a product in stick form (50).

25 Claims, 10 Drawing Sheets

(51) Int. Cl.

| | |
|---|---|
| ***A45D 40/16*** | (2006.01) |
| ***B31B 50/62*** | (2017.01) |
| *B31B 100/00* | (2017.01) |

(56) References Cited

U.S. PATENT DOCUMENTS

| | | | | |
|---|---|---|---|---|
| 2021/0292038 | A1* | 9/2021 | Dudlak | B65D 3/28 |
| 2022/0087398 | A1* | 3/2022 | Dunton | A45D 40/04 |

* cited by examiner

DISPENSERS

TECHNICAL FIELD

The present invention relates to methods of manufacturing dispensers for products in stick form, for example, but not limited to, cosmetics, deodorants, lipsticks, lip balms, adhesives and other products for topical application to a surface, for example to a person's skin or lips. The product in stick form may be any consumer or personal care product, for example. The invention extends to a dispenser obtained in accordance with the invention in any of its aspects or embodiments, and to an assembly comprising such a dispenser in combination with a product in stick form.

BACKGROUND

Stick products such as lipsticks are supplied in a number of dispensers. The most common dispenser comprises a tubular plastics shell having a removable cap. The container receives a cartridge of a material for application which can, after removal of the cap, be twisted in order to extend the stick of material from the shell and to retract the stick material into the shell after application, whereupon the cap may be closed once more.

Whilst this is a very effective form of dispenser, it is desirable to reduce the amount of plastic material used in the dispenser. However, there may be some challenges in manufacturing a dispenser for a product in stick form from other materials.

SUMMARY

In accordance with a first aspect of the invention there is provided:

- a method of manufacturing a dispenser for a product in stick form, the dispenser comprising an inner tube and a product concealing tube disposed outwardly of the inner tube, wherein the product concealing tube is retractable and extendable relative to the inner tube for exposing and covering a product stick extending from a distal end of the inner tube in use;
- the method comprising:
- providing a first blank of sheet material for providing the inner tube of the dispenser;
- wrapping the first blank around a mandrel to provide the inner tube of the dispenser;
- providing a second blank of sheet material for providing the product concealing tube of the dispenser;
- wherein the second blank comprises a slot, and a guide element disposed within the slot;
- applying a bonding agent to the second blank in a region corresponding to a surface of the guide element;
- wrapping the second blank around the inner tube while the inner tube is held on a mandrel to provide the product concealing tube, with the surface of the guide element to which bonding agent has been applied facing the inner tube, such that the guide element becomes bonded to an exterior surface of the inner tube, and wherein the slot provides a recess in the interior surface of the formed product concealing tube;
- wherein, in use, the product concealing tube is movable relative to the inner tube with the guide element cooperating with the recess for guiding the movement of the product concealing tube relative to the inner tube.

The present invention provides a method of manufacturing a dispenser for a product in stick form. The dispenser comprises an inner tube and a product concealing tube disposed (radially) outwardly of the inner tube. The product concealing tube is retractable and extendable relative to the inner tube for exposing and covering a product stick extending from a distal end of the inner tube in use.

It will be appreciated that the distal end of the inner tube corresponds to an upper end thereof. References to proximal and distal ends of components as used herein may be replaced by references to upper and lower ends thereof, unless the context demands otherwise.

In accordance with the invention a first blank of sheet material is wrapped around a mandrel in order to provide the inner tube. A second blank of sheet material is wrapped around the inner tube to provide the product concealing tube. The second blank of sheet material includes a slot and a guide element disposed within the slot. A bonding agent is applied to the second blank in a region corresponding to a surface of the guide element. In this way, when the second blank is wrapped around the inner tube to provide the product concealing tube, the bonding agent applied to the surface of the guide element bonds the guide element to the exterior surface of the inner tube. The slot provides a recess in the interior surface of the formed product concealing tube.

The guide element may be frangibly connected to a periphery of the slot in the second blank. This may help to retain the guide element in position within the slot during handling of the second blank prior to and, in some cases, during performance of at least some of the steps of the method described herein. However, it is envisaged that a frangible connection need not necessarily be used. For example, depending upon the configuration of the guide element and slot, the guide element may be held in place to a sufficient degree by frictional engagement between the periphery of the guide element and the periphery of the slot.

The product concealing tube is movable relative to the inner tube in use. The product concealing tube is moveable relative to the inner tube in this way in the dispenser obtained by the methods described herein. Where there is a frangible connection between the guide element and the periphery of the slot in the second blank, the product concealing tube is movable relative to the inner tube once the frangible connection between the guide element and the periphery of the slot has been broken. Movement of the product concealing tube relative to the inner tube is guided by cooperation between the guide element and the recess.

The product concealing tube is slidably movable relative to the inner tube, and preferably is slidably and rotatably movable relative thereto. The dispenser may be configured such that the product concealing tube may follow a helical path as it moves relative to the inner tube. Thus, the method is a method of manufacturing a dispenser in which the product concealing tube is movable relative to the inner tube in this way in use. The product concealing tube is preferably retractable and extendable relative to the inner tube along a helical path for exposing and covering a product stick in use.

In any of the aspects or embodiments of the invention, the product concealing tube is moveable between extended and retracted positions relative to the inner tube for covering and exposing a product stick extending from a distal end of the inner tube respectively in use. The product concealing tube may be movable between a fully extended, and a fully retracted position relative to the inner tube. The fully extended and fully retracted positions refer to the maximum available extended and retracted positions of the product concealing tube relative to the inner tube in the dispenser, (where applicable, after breaking of the frangible connection (whenever this occurs)). The maximum available extended and retracted positions may e.g. be as permitted by the cooperation of the guide element with the recess.

It has therefore been recognised, that a guide element may be integrally formed with a blank for providing the product concealing tube, which blank also includes a slot for providing a recess with which the guide element will cooperate in use in order to guide movement of the product concealing tube relative to the inner tube. The guide element is provided as part of the blank for providing the product concealing tube, being disposed within the slot (and optionally frangibly connected to a periphery thereof). When the blank for providing the product concealing tube is wrapped around the inner tube, a bonding agent applied to a surface of the guide element causes the guide element to become bonded to the exterior surface of the inner tube, while remaining within the slot in the blank of the product concealing tube which provides a recess in the interior surface of the formed product concealing tube. In use, (and, where applicable, once the frangible connection between the periphery of the slot and the guide element has been broken), the product concealing tube is free to move relative to the product concealing tube, with the relative movement being guided by cooperation of the guide element with the recess. In this way, the need to provide an additional component comprising a guide element for guiding relative movement between the inner tube and product concealing tube is avoided.

The present invention therefore provides a simple and effective method for providing a dispenser of a type in which a product concealing tube is movable relative to an inner tube which supports a product stick in order to conceal or expose the product stick, enabling a mechanism for guiding the movement of the product concealing tube relative to the inner tube to be provided using a minimal number of components, and which may be implemented using more sustainable card or paper-based materials, avoiding the need to provide plastic components. By avoiding the need to provide a separate guide element component, e.g. radially between the inner tube and product concealing tube, the dispenser may be made more compact. The method is implemented using an automated process.

The first and second blanks are each blanks of sheet material. The sheet material may be a paper-based or card-based material, such as paperboard or cardboard. The inner tube and product concealing tube are thus made of paper-based or card-based material, such as paperboard or cardboard. The present invention thus provides a method enabling a dispenser for a product stick to be made more readily from more sustainable materials, and may enable the use of plastic materials in the dispenser to be avoided or at least reduced. Advantageously the dispenser is free from plastic material.

The method may further comprise removing the sub-assembly of the inner tube and product concealing tube from the mandrel around which the second blank was wrapped to provide the product concealing tube. The product concealing tube is movable relative to the inner tube in any of the manners described herein in the resulting sub-assembly, at least after the breaking of any frangible connection between the guide element and slot. The product concealing tube is also movable as described herein relative to the inner tube in the resulting dispenser, which may, and typically does, include additional components. It will be appreciated that, in embodiments in which a frangible connection between the guide element and periphery of the slot is present in the second blank, the relative movement between the inner tube and product concealing tube described herein is the movement that is possible once that frangible connection is broken.

In embodiments in which the guide element is frangibly connected to a periphery of the slot in the second blank, the frangible connection between the guide element and the periphery of the slot may be broken at any suitable stage.

Breaking of the frangible connection refers to breaking of the connection to permit movement of the product concealing tube relative to the inner tube. Partial breaking of the frangible connection may occur at a preceding stage to a stage at which this final breaking of the frangible connection to permit relative movement occurs. Thus it will be understood that some e.g. frangible bridges might break during an earlier step e.g. wrapping of the second blank, while complete breakage of the frangible connection is only complete on removal of the inner tube and product concealing tube sub-assembly from the mandrel on which the second blank is wound, for example.

The method may extend to the step of breaking the frangible connection to enable the product concealing tube to move relative to the inner tube.

The connection may be broken upon first use of the dispenser by a user.

However, preferably the frangible connection is broken during manufacture of the dispenser.

Once the frangible connection has broken, whenever this occurs, the product concealing tube and inner tube may be held together by frictional engagement, while still permitting movement of the product concealing tube relative to the inner tube when operated manually by a user.

Preferably the method further comprises the step of removing the sub-assembly of the inner tube and product concealing tube from the mandrel around which the second blank was wrapped to provide the product concealing tube, and the frangible connection is broken during or prior to the step of removing the sub-assembly of the inner tube and product concealing tube from the mandrel around which the second blank was wrapped to provide the product concealing tube. This may provide greater control over the breaking of the frangible connection.

In particularly preferred embodiments the frangible connection is broken during the step of wrapping the second blank around the inner tube to provide the product concealing tube. The act of wrapping the second blank around the inner tube then causes the frangible connection to be broken. Whether or not this step causes the frangible connection to break will depend upon factors such as the strength of the frangible connection, the properties of the material forming the second blank e.g., its resistance to winding etc. The connection may be designed appropriately such that it will break under the conditions expected during wrapping of the second blank.

In other embodiments the frangible connection is broken after wrapping the second blank around the inner tube to provide the product concealing tube. For example, the frangible connection may break during removal of the sub-assembly of the inner tube and product concealing tube from the mandrel around which the second blank was wrapped to provide the product concealing tube. This may occur as the product concealing tube is urged to move relative to the inner tube from a retracted to an extended position during removal from the mandrel. However, in other embodiments it is envisaged that the frangible connection may be broken at a later stage.

A specific step may be performed in order to cause the frangible connection to break e.g. after the step of wrapping the second blank around the inner tube to provide the product concealing tube. Such a step may be performed where breaking of the frangible connection does not inherently occur in the wrapping of the second blank or the removal of the sub-assembly of the inner tube and product concealing tube from the mandrel, or any other process step. The method may comprise the step of subjecting the dispenser to a force tending to cause movement of the product concealing tube relative to the inner tube in order to break the frangible connection between the guide element and the slot. For example, a force may be applied to the dispenser tending to pull the product concealing tube and inner tube apart. The force may be an axial force, or may comprise axial and radial components where the product concealing tube is rotatably and slidably movable relative to the inner tube.

In any of the aspects or embodiments of the invention, the first and second blanks may be wrapped in any suitable manner to provide the inner tube and product concealing tube respectively.

Any suitable method may be used which results in the first blank becoming wrapped around the mandrel to provide the inner tube, and the second blank becoming wrapped around the inner tube.

The first blank is wrapped around a mandrel to provide the inner tube. The mandrel is preferably a rotating mandrel. The step of wrapping the first blank around the mandrel may comprise feeding the first blank around the rotating mandrel.

The second blank is wrapped around the inner tube to provide the product concealing tube while the inner tube is held on a mandrel. The second blank is wrapped around the inner tube while the inner tube is rotating. The inner tube is held on a rotating mandrel. The step of wrapping the second blank around the inner tube may comprise feeding the second blank around the rotating inner tube. The second blank is directly (radially) outward of the inner tube while being wrapped around the inner tube to enable the guide element to become bonded to the exterior surface of the inner tube.

It will be appreciated that the first blank is wrapped around the mandrel to provide the inner tube, and the second blank is then wrapped around the resulting inner tube to provide the product concealing tube. Thus these steps are sequential. The first and second blanks are not simultaneously wound around a mandrel.

Preferably the second blank of sheet material is wrapped around the inner tube to provide the product concealing tube while the inner tube is still located on the mandrel used to produce the inner tube. Thus, the first and second blanks of sheet material are preferably wrapped around the same mandrel. This may provide a more efficient process. The step of wrapping the second blank of sheet material around the inner tube while located on the mandrel may comprise feeding the second blank of sheet material around the inner tube while supported on the mandrel and with the mandrel and inner tube rotating. Of course, in other embodiments, it is envisaged that the inner tube might be removed from the mandrel on which it was wrapped and mounted on a different mandrel, about which the second blank is wrapped when wrapping the second blank around the inner tube. Thus, the mandrels used in wrapping the first and second blanks may be different, but are preferably the same.

In accordance with the invention, a bonding agent is applied to the second blank in a region corresponding to a surface of the guide element. The surface is a surface of the guide element on a side of the second blank which will face the exterior surface of the inner tube when the second blank is wrapped around the inner tube to produce the product concealing tube. In this way, when the second blank is wrapped around the inner tube to produce the product concealing tube, the guide element becomes bonded to the exterior surface of the inner tube. Thus, the guide element is fixed with respect to the inner tube. The guide element is rotationally fixed with respect to the inner tube. Any suitable bonding agent may be used e.g. adhesive. The guide element is directly bonded to the exterior surface of the inner tube.

In the dispenser, (at least once any frangible connection between the guide element and the periphery of the slot has been broken), the product concealing tube is free to move relative to the inner tube with the movement guided by cooperation between the guide element and the recess provided by the slot. Thus, the application of bonding agent to the second blank should be performed in a manner which does not interfere with the ability of the product concealing tube to move relative to the inner tube. For example, the bonding agent should be applied with a sufficient tolerance that, allowing for any spreading when the guide element is bonded to the inner tube, it does not extend beyond the periphery of the guide element into a region which could result in a portion of the second blank surrounding the slot in the region of the guide element becoming bonded to the inner tube. Bonding agent is not applied to the region of the second blank surrounding the periphery of the slot.

In embodiments bonding agent is not applied to any other portion of the surface of the second blank which will face the inner tube and form part of the interior surface of the formed product concealing tube which is intended to be movable relative to the inner tube in the dispenser in use. In other words, the bonding agent is not applied to any other part of the second blank which will face the inner tube and form part of the innermost winding of the second blank in forming the product concealing tube.

The step of wrapping the second blank around the inner tube to provide the product concealing tube may be performed such that the guide element is the only portion of the second blank which becomes fixed e.g. bonded to the inner tube. The guide element is the only portion of the interior surface of the innermost winding of the second blank that is bonded to the exterior surface of the inner tube.

After wrapping of the second blank around the inner tube to provide the product concealing tube, the formed product concealing tube may be unattached to the inner tube other than by means of the guide element where a frangible connection between the guide element and slot remains unbroken. Thus, where a frangible connection is broken during the wrapping of the second blank around the inner tube, or where no frangible connection is provided, the product concealing tube may be unattached to the inner tube, or, where the frangible connection is yet to be broken, the product concealing tube may be attached to the inner tube only by means of the guide element.

The product concealing tube and inner tube may be retained in their wrapped configuration by appropriate bonding. For example, a bonding agent may be used e.g. adhesive. In some embodiments a bonding agent is provided on a surface of the respective blank that provides an inner surface of the blank during wrapping adjacent the trailing edge of the blank for retaining the wrapped tube in its wrapped configuration. The bonding agent will bond the region adjacent the trailing edge of the blank to an adjacent, inner winding of the tube formed from the blank. The bonding agent applied to the second blank should not interfere with the ability of the resulting wrapped product concealing tube to move relative to the inner tube, at least once any frangible connection between the guide element and periphery of the slot has been broken.

In some embodiments, a bonding agent is applied to the second blank only on a surface of the blank which forms an inner surface of the blank during wrapping of the blank around the inner tube, and only in a region of the surface corresponding to a surface of the guide element, and a region in the vicinity of an edge of the blank that provides a trailing edge of the blank during wrapping for retaining the wound product concealing tube in a wrapped configuration.

The second blank overlaps the inner tube during wrapping of the second blank around the inner tube to provide the product concealing tube. The second blank may be positioned relative to the inner tube during wrapping such that the product concealing tube once formed is in a position relative to the inner tube which will correspond to a fully retracted position of the product concealing tube relative to the inner tube in the dispenser. The fully retracted position of the product concealing tube in the dispenser is the most retracted position of the product concealing tube relative to the inner tube available. This may better support the product concealing tube during wrapping and facilitate bonding of the guide element to the inner tube. The guide element may be located at a first end of the slot in the second blank, and the method may comprise wrapping the second blank around the inner tube such that the first end of the slot will provide a distal end of the slot in the dispenser. This will result in the product concealing tube being in a most retracted position relative to the inner tube once formed. The product concealing tube will only be able to be extended and not retracted from that position.

A proximal end edge of the inner tube may project beyond a proximal end edge of the product concealing tube when the product concealing tube is in a fully retracted position relative to the inner tube in the dispenser. The projecting portion of the inner tube may facilitate operation of the dispenser. For example, it may be fixed to an outer tube as described below to enable operation of the device by twisting the outer tube relative to the product concealing tube.

In some embodiments, a first edge of the second blank which provides the proximal end edge of the product concealing tube is located inboard of the proximal end edge of the inner tube during wrapping of the second blank around the inner tube.

Alternatively or additionally, a second edge of the second blank which provides the distal end edge of the product concealing tube may be located inboard of the distal end edge of the inner tube during wrapping of the second blank around the inner tube. This may facilitate the wrapping process. The product concealing tube may move to a more extended position relative to the inner tube during removal of the inner tube and product concealing tube sub-assembly from the mandrel. This may be the case where no frangible connection is provided between the guide element and the periphery of the slot in the second blank, or where a frangible connection is broken during the wrapping of the second blank around the inner tube or subsequently during removal of the inner tube and product concealing tube sub-assembly from the mandrel around which the second blank is wound.

The extent to which the second edge of the second blank is recessed relative to the distal end edge of the inner tube may be selected as desired. The distance may be relatively small so as to maximise the resultant available travel of the product concealing tube relative to the inner tube.

The inner tube may have a height greater than a height of the product concealing tube.

The inner and product concealing tubes are each formed from a single blank. Preferably the first and second blanks are each single piece blanks.

The inner and product concealing tubes formed from the first and second blanks are not spiral-wound tubes. Spiral-wound tubes are produced by winding strips at an angle over a mandrel, and laminating the strips together. Avoiding the use of a spiral winding process has been found to be advantageous for a number of reasons. This may facilitate assembly of the dispenser, and may result in a less rigid tube. Avoiding a spiral winding technique may reduce the number of plies present in the tube as far as possible. For example an area defined by a single ply of material may be maximised and/or the maximum number of plies present at any point may be kept below a desired maximum e.g. two. Avoiding the use of spiral winding may also enable a smooth outer surface of a tube to be provided, devoid of seams, which can be directly printed, if desired. This may be useful for surfaces which may be visible in use, such as an exterior surface of the product concealing tube. Finally, an end of a non-spiral-wound tube may be more readily rolled back into the interior of the tube, if desired e.g. for providing a retaining lip for retaining an end closure for the tube.

When wrapping the first blank of sheet material to provide the inner tube and/or the second blank of sheet material to provide the product concealing tube, the method may comprise wrapping the respective blank of sheet material about the mandrel used in winding the blank such that each of the opposed axially spaced end edges of the respective blank extends perpendicular to an axis of the mandrel throughout wrapping of the respective tube therefrom. The opposed axially spaced end edges of the blank are the end edges which are spaced along the axis of the mandrel during wrapping, and which will be axially spaced in the resulting wrapped tube. The axially spaced end edges of the blank follow a circular path during wrapping of the blank. The axially spaced end edges of the blank do not follow a helical path during wrapping of the blank. The axially spaced end edges are maintained at the same axial position throughout the wrapping process (e.g. with respect to an axis of a mandrel upon which the blank is wound). In the resulting wrapped tube, the opposed axially spaced end edges of the blank do not define a helical path. The end edges may extend circumferentially but not axially with respect to the wrapped tube. Using a wrapping process in which the blanks do not follow a helical path has been found to facilitate wrapping of the tubes, and may make the wrapping process easier to control, as well as providing advantages in relation to the resulting dispenser as described above.

In the formed (wrapped) inner tube or product concealing tube, the axially spaced end edges of each turn of the blank forming part of the tube may be axially aligned with one another.

The first blank may comprise first and second opposed edges for providing proximal and distal end edges of the wrapped inner tube, the first and second edges being connected at their respective ends by opposed third and fourth edges. The first and second opposed edges may be referred to as opposed axially spaced end edges of the blank. These edges are spaced along a direction which will correspond to an axis of the resulting tube (and are spaced along an axis of a mandrel used in winding the tube). The first and second opposed edges may be parallel to one another. The third and fourth edges may be parallel to one another.

The third edge of the first blank provides a leading edge of the first blank as it is wrapped around the mandrel to provide the inner tube, and the fourth edge a trailing edge of the first blank during wrapping around the mandrel.

Preferably at least one of the third and fourth edges (preferably at least the third edge) is connected to the first edge so as to define an angle other than 90 degrees with the first edge and is connected to the second edge so as to define an angle other than 90 degrees with the second edge. This may provide a bevelled edge of the first blank. The third and/or fourth edge may be a straight edge. In other words, one or optionally both of the third and fourth edges may be connected to both of the first and second edges, so as to be non-perpendicular thereto. Thus, in these embodiments, rather than extending perpendicular to both the first and second edges, the third and/or fourth edge is a sloping i.e. bevelled edge. Advantageously at least the third, i.e. leading edge, is shaped in this manner.

In embodiments, the at least one of the third and fourth edges defines an angle of less than 90 degrees, or less than 80 degrees or less than 70 degrees with respect to one of the first and second edges e.g. the second edge, and/or of at least 30 degrees or at least 40 degrees.

Alternatively or additionally, the at least one of the third and fourth edges may define an angle with respect to the other one of the first and second edges e.g. the first edge of more than 90 degrees, and no more than 160 degrees or no more than 150 degrees or no more than 140 degrees and/or of at least 100 degrees.

By providing third and/or fourth edges which are angled with respect to the first and second edges in this manner, the lap seam created by the overlap between the respective edge and an underlying or overlying winding of the first blank as a result of wrapping the blank around the mandrel to produce the inner tube may be spread around the circumference of the resulting inner tube to a greater extent than would be the case if the applicable one of the third or fourth edges were perpendicular to both the first and second edges. The seam may extend along a helical path. This has been found to provide an improved tube with a rounder cross section in comparison to the case if a lap seam extending perpendicular to both the first and second edges were used, which may tend to result in a tube exhibiting a teardrop shape.

The at least one of the third or fourth edges which is connected at an angle other than 90 degrees to the first and second edge may provide a helically extending seam with an adjacent winding of the inner tube in the formed (wrapped) tube. The seam is located to the interior of the formed tube when provided by the third edge, and to the exterior of the formed tube if provided by the fourth edge. Thus the adjacent winding of the inner tube will be an adjacent outer or inner winding of the tube respectively.

Advantageously at least the leading edge of the first blank i.e. the third edge is non-perpendicular to the first and second edges in order to provide the functional benefit described above. This edge will typically not be visible from the exterior of the resulting inner tube. In particular, where the inner tube does not form part of the exterior surface of the dispenser in any of its operational states, or where the appearance of the inner tube is less important, it may be advantageous to provide sloping edges at both ends thereof to provide the full functional advantage associated with the resulting helical seams. Where one of the surfaces of the inner tube is visible from the exterior of the product it may be desirable to avoid the presence of the helical seam, in particular if it is intended to print the surface of the tube. A helical seam may interfere with the ability to easily print a surface of a tube. Whether or not a sloping end edge is used at either or both ends of the first blank will depend upon which properties are of greater importance in the resulting inner tube.

In embodiments the first blank comprises first and second opposed edges for providing proximal and distal end edges of the inner tube, the first and second edges being connected at their respective ends by opposed third and fourth edges, wherein the third edge provides a leading edge of the blank as it is wrapped around the mandrel to provide the inner tube, and the fourth edge a trailing edge of the blank, wherein the third edge is connected to the first edge so as to define an angle other than 90 degrees with the first edge and is connected to the second edge so as to define an angle other than 90 degrees with the second edge so as to provide a sloping leading edge of the first blank, and optionally wherein the fourth edge is connected to the first edge so as to define an angle other than 90 degrees with the first edge and is connected to the second edge so as to define an angle other than 90 degrees with the second edge so as to provide a sloping trailing edge of the first blank.

It will be appreciated that one or more of the corners of the first blank may be rounded. In these cases, the rounding at the corner is disregarded when determining the angle between the sides which are connected to one another at that corner, and the general path of the sides approaching the corner is considered. For example, a leading corner of the blank may be rounded to facilitate processing e.g. to reduce the risk of the corner being buckled when fed onto the mandrel.

The first blank may be in the shape of a parallelogram comprising first and second pairs of parallel edges, wherein the parallelogram is not a square or rectangle. Thus, none of the interior angles is 90 degrees. It will be appreciated that one or more corners of the parallelogram may be rounded.

The first blank may be devoid of openings extending therethrough from one side to the other.

The second blank may comprise first and second opposed edges for providing proximal and distal end edges of the inner tube, the first and second edges being connected at their respective ends by opposed third and fourth edges. The first and second edges may be parallel over a substantial portion e.g. at least 80% or at least 90% of a length thereof. For example, some degree of chamfering may be present adjacent a trailing edge of the blank at one or both ends of the fourth, trailing edge. Chamfering may reduce the amount of material present in the region of an exterior seam of the wrapped tube, and may facilitate printing and other finishing operations.

The third edge provides a leading edge of the second blank as it is wrapped around the inner tube to provide the product concealing tube, and the fourth edge a trailing edge of the second blank. Preferably the third edge is connected to the first edge so as to define an angle other than 90 degrees with the first edge and is connected to the second edge so as to define an angle other than 90 degrees with the second edge. The third edge may be a straight edge. In other words, the third edge may be non-perpendicular to both of the first and second edges. The third edge may then provide a bevelled edge of the second blank. Thus, in these embodiments, rather than extending perpendicular to both the first and second edges, the third edge connecting the first and second edges is a sloping i.e. bevelled edge. The fourth edge i.e. the trailing edge may or may not be shaped in the same manner as the third edge.

In embodiments, the third edge defines an angle of less than 90 degrees, e.g. less than 80 degrees or less than 70 degrees with respect to one of the first and second edges e.g.

the second edge, and/or of at least 30 degrees or at least 40 degrees. Alternatively or additionally, the third edge may define an angle with respect to the other one of the first and second edges e.g. the first edge of greater than 90 degrees, and no more than 160 degrees or no more than 150 degrees or no more than 140 degrees and/or of at least 100 degrees.

As described in relation to the first blank, by providing a third edge which is angled with respect to the first and second edges in this manner, the lap seam created by the overlap between the respective edge and an overlying winding of the second blank as a result of wrapping the blank around the inner tube to produce the product concealing tube may be spread around the circumference of the resulting tube to a greater extent than would be the case if the third edge were perpendicular to both the first and second edges.

The third edge may provide a helically extending seam with an adjacent (i.e. outer) winding of the product concealing tube in the formed (wrapped) tube. The seam is located to the interior of the formed tube.

Advantageously at least the leading edge i.e. the third edge is non-perpendicular to the first and second edges in order to provide the functional benefit described in terms of spreading the lap seam, as the edge will be located to the interior of the resulting product concealing tube. In contrast, at least a portion of the fourth edge of the second blank may be visible from the exterior of the dispenser, and the shape of the edge may be constrained by the desired external appearance of the product concealing tube, and/or the need to be able to easily print on the exterior of the product concealing tube. In some exemplary embodiments, the fourth edge of the second blank defines an angle of 90 degrees with at least one of the first and second edges e.g. the second edge where it is connected thereto so as to provide a "straight", non-angled edge, which may assist in maximising an available seam free area of the exterior surface.

The fourth edge may also define an angle of 90 degrees with the other of the first and second edges e.g. the first edge, or may define an angle other than 90 degrees therewith, such as less than 90 degrees. The first edge may comprise a first portion extending parallel to the second edge, and a second portion adjacent the fourth edge and connecting the first portion of the first edge to the fourth edge, wherein the second portion of the first edge defines an angle other than 90 degrees with the first portion of the first edge and an angle other than 90 degrees with the fourth edge. The second blank may therefore comprise a chamfered region at a transition between the first edge and the fourth edge. Alternatively or additionally a chamfered region might be provided at a transition between the second edge and fourth edge.

It will be appreciated that one or more of the corners of the second blank may be rounded. In these cases, the rounding at the corner is disregarded when determining the angle between the sides which are connected to one another at that corner, and the general path of the sides approaching the corner is considered. For example, a leading corner of the blank may be rounded to facilitate processing e.g. to reduce the risk of the corner being buckled when fed around the inner tube.

In embodiments the second blank may comprise first and second opposed edges for providing proximal and distal end edges of the product concealing tube, the first and second edges being connected at their respective ends by opposed third and fourth edges, wherein the third edge provides a leading edge of the second blank as it is wrapped around the inner tube to provide the product concealing tube, and the fourth edge a trailing edge of the second blank, wherein the third edge is connected to the first edge so as to define an angle other than 90 degrees with the first edge, and is connected to the second edge so as to define an angle other than 90 degrees with the second edge so as to provide a sloping leading edge of the blank.

The first blank may have a height at least as great, and optionally greater than a height of the second blank. The height of the first and second blanks corresponds to the dimension of the blank in the direction which will correspond to an axial direction of the wrapped tube formed therefrom. This will correspond to a direction perpendicular to the first and second edges thereof. In this way, the inner tube may extend over at least the full height of the product concealing tube.

The second blank comprises a slot. The slot is preferably configured such that, once the second blank has been wrapped around the inner tube to provide the product concealing tube, each of the side edges of the recess provided by the slot in the interior surface of the product concealing tube extends along a helical path. This will result in the product concealing tube being slidably and rotatably movable relative to the inner tube guided by cooperation of the guide element with the recess. The side edges of the slot refer to the edges which extend in the height direction of the blank between the first and second end edges thereof. The slot may further comprise at least one end edge connecting the side edges, and may comprise opposed end edges connecting the side edges. The end edge(s) may be curved or straight. A smooth transition may be provided between the end edge(s) and side edges of the slot.

The term "helical" as used herein refers to a path having both circumferential and axial components, and does not confer any limitation in relation to the angle of rotation provided by the path.

Each of the side edges of the slot thus preferably extends in a direction that is non-perpendicular with respect to the first and second edges of the second blank. This will result in the side edges following a helical path in the formed product concealing tube.

A direction of the slot may be defined by the direction of a longitudinal axis of the slot, which may or may not correspond to the direction of the side edges of the slot. The longitudinal axis of the slot thus may or may not extend along a direction that is non-perpendicular to the first and second edges of the second blank. A direction of the recess defined by a longitudinal axis of the slot may or may not extend along a helical path in the formed product concealing tube.

An angle of inclination of the side edges of the slot may be used to define the circumferential and axial components of the available travel of the product concealing tube relative to the inner tube. The most appropriate angle will depend upon the intended properties and use of the resulting dispenser.

By way of example and not limitation, the slot may be configured to provide a recess in the interior surface of the product concealing tube having side edges each extending along a helical path at least 20 degrees and/or less than 105 degrees, such as from 20 degrees to 105 degrees around the axis of the product concealing tube. Alternatively or additionally a direction of the recess defined by a longitudinal axis of the slot may extend along a helical path in the formed product concealing tube extending around the axis of the product concealing tube in any of these ranges.

The slot may be of any suitable shape. In some embodiments the side edges of the slot are straight. However, it will be appreciated that the side edges of the slot may alternatively be curved, or may include both curved and straight portions. The most appropriate shape of the slot will depend upon the desired extent of the movement to be permitted between the product concealing tube and inner tube.

The slot may extend axially over any desired portion of the height of the product concealing tube and hence second blank, such as, by way of example and not limitation, at least a quarter or at least 50% of the height thereof.

The slot defines a recess in the interior of the product concealing tube formed by wrapping the second blank around the inner tube. The boundary of the recess is defined by the periphery of the slot i.e. the edges thereof. Thus the edges of the recess are provided by the edges of the slot, and the area of the recess corresponds to the area of the slot. Various features of the slot are described below, and it will be appreciated will give rise to corresponding feature of the recess. The term recess is used in connection with the formed product concealing tube as the slot may not, and in embodiments does not, provide a slot extending through the wall of the resulting formed product concealing tube, instead being covered by an outer layer of the tube. However, the slot from the second blank is still present in the interior surface of the tube, and references to the slot in the context of the tube should be understood accordingly.

The recess provided by the slot extends at least partially, and optionally only partially, through the wall of the formed i.e. wrapped product concealing tube. The recess may itself be in the form of a slot extending through the wall of the product concealing tube. However, preferably the second blank is wound to provide the product concealing tube in a manner such that the slot in the second blank is covered by an outer winding of the second blank (and optionally by only one outer winding thereof). In the resulting product concealing tube, the slot is covered by an outer layer of the product concealing tube, and optionally by only one other layer of the product concealing tube. Thus, the slot is not exposed from the exterior of the product concealing tube. The slot is not visible from the exterior of the wound product concealing tube. This may provide an improved appearance to the dispenser, and may help to protect the slot and the guide element.

The recess provides an area within which the guide element is free to move during movement of the product concealing tube relative to the inner tube in use, (at least after breaking of any frangible connection between the guide element and periphery of the slot). The guide element cooperates with the edges of the recess to define the extent of possible movement between the product concealing tube and inner tube. In the event that a frangible connection breaks during wrapping of the second blank around the inner tube, the guide element will remain within the edges of the slot during the wrapping step.

In some embodiments the slot may be of substantially uniform width, and a greatest width of the guide element (e.g. lug) may correspond substantially to a width of the slot. This may substantially prevent lateral movement of the guide element within the recess defined by the slot in the product concealing tube. The guide element may be snugly received between the side edges of the recess provided by the slot along the entire extent of the relative movement available between the guide element and the recess provided by the slot. In these arrangements, the guide element will cooperate with the side edges of the recess over the entire extent of the relative movement available between the guide element and the recess to guide the relative movement between the product concealing tube and inner tube. The engagement between the guide element and the side edges of the recess provided by the slot may define the path of the relative movement between the product concealing tube and inner tube.

However, in some situations, it may be desirable for some degree of lateral movement of the guide element within the recess provided by the slot to be possible over at least a portion of the length of travel of the guide element relative to the recess as described below e.g. to facilitate manufacture and subsequent operation. This may help to ensure that the guide element remains within the recess even under the effect of forces which may arise during wrapping of the product concealing tube, and may enable the user to move the product concealing tube relative to the inner tube in varying manners to extend and retract the product concealing tube in use constrained only by the requirement for the guide element to remain within the recess.

The slot may be configured such that it provides a recess extending to a proximal edge of the product concealing tube. The slot may thus extend to an edge of the second blank which provides a proximal end edge of the product concealing tube i.e. a first edge of the second blank. In other embodiments the slot is configured such that it provides a recess having a proximal end spaced from a proximal end of the product concealing tube. The end of the slot closest to the edge of the second blank which provides the proximal end edge of the product concealing tube i.e. the first edge of the second blank may thus be spaced from that edge of the second blank.

Whether or not the slot extends to the edge of the second blank which provides the proximal end edge of the product concealing tube, the slot preferably does not extend to the edge of the second blank which provides the distal end edge of the product concealing tube. Thus the end of the slot closest to the edge of the second blank which provides the distal end edge of the product concealing tube i.e. the second edge of the second blank is preferably spaced from that edge of the second blank.

In embodiments the slot comprises side edges and opposed end edges. The end edges are spaced from (i.e. inboard of) the edges of the second blank which provide the proximal and distal end edges of the product concealing tube. The recess will correspondingly comprise side edges and opposed end edges, the end edges being spaced from i.e. inboard of the proximal and distal end edges of the product concealing tube.

Where the slot comprises opposed end edges spaced from the edges of the second blank, the fully extended and fully retracted positions of the product concealing tube relative to the inner tube may correspond to positions in which the guide element abuts respective ones of opposed end edges of the recess defined by the slot in the product concealing tube so as to act as a stop preventing further movement of the product concealing tube relative to the inner tube in a given direction.

The slot may be located closer to a third edge of the second blank which provides a leading edge during winding of the blank to provide the product concealing tube than to a fourth edge of the second blank which provides a trailing edge thereof during winding. This may help to ensure that the slot is covered by an outer layer, and preferably by only one outer layer, of the wound product concealing tube.

In some embodiments the side edges of the slot extend parallel to one another. A width of the slot may be uniform along its length. The side edges of the resulting recess will thus also extend parallel to one another. The side edges of the slot may each extend along a direction that is other than 90 degrees with respect to both the first and second end edges of the second blank. A longitudinal axis of the recess defined by the slot in the product concealing tube may then extend along a helical path. The side edges of the slot defining the recess in the product concealing tube may each extend along a helical path.

However, in other embodiments the side edges of the slot diverge from one another with distance from one end thereof. The side edges may not reconverge once more between the ends of the slot. In embodiments in which the side edges of the slot diverge, the side edges (and any end edges) of the slot may be straight or curved or combinations thereof. It has been found that a slot of a shape in which the side edges diverge from one another with distance from an end thereof may increase the ease with which the second blank may be wrapped around the inner tube to provide the product concealing tube, reducing the tendency of the blank to crease. The recess provided by the slot will be of corresponding shape to the slot. Each of the side edges of the recess provided by the slot will then extend along a helical path in the formed product concealing tube. The slot shape may provide greater freedom of movement of the guide element (e.g. lug) within the slot during winding of the second blank to provide the product concealing tube (e.g. where no frangible connection between the guide element and periphery of the slot is provided, or in the event a frangible connection breaks during the wrapping step), while still maintaining the guide element within the slot and reducing the tendency of the guide element to jam or ride over the edges of the slot. For example, the slot (and hence recess) may be wedge shaped e.g. teardrop shaped. During operation of the dispenser, the product concealing tube may be moved relative to the inner tube in any desired manner to extend or retract the product concealing tube relative to the inner tube, provided that the guide element remains within the boundary defined by the periphery of the recess provided by the slot. Thus, the guide element need not necessarily engage a side edge of the slot during extension and retraction of the product concealing tube.

Preferably the end of the slot with distance from which the side edges of the slot diverge is an end of the slot at which the guide element is disposed in the second blank. The end of the slot may then bean end of the slot to which the guide element is frangibly connected in the second blank. The end may be an end which is closest to the edge of the second blank which will define a distal end edge of the product concealing tube i.e. the second edge of the second blank. This may result in the product concealing tube at least initially being located in a fully retracted position relative to the inner tube once wrapped there around. A frangible connection of the guide element at an end of the slot may also facilitate manufacture of the second blank. The side edges of the slot may diverge with one another in a manner such that the width of the slot exceeds a width of the guide element over at least a portion of the length of the slot. The side edges of the slot may diverge from one another from a closest spacing corresponding substantially to a width of the guide element extending therebetween at the end of the slot. The recess defined by the slot will be of a corresponding shape to the slot (and relative to the guide element).

Regardless of the shape of the slot, the guide element may be disposed at one end of the slot in the second blank. Thus, the guide element may be at the end of the slot when frangibly connected to the periphery thereof. The end of the slot is preferably an end which lies closest to the second edge of the second blank which will define a distal end edge of the product concealing tube. The guide element has a length less than a length of the slot in these embodiments. This may maximise the available travel of the product concealing tube relative to the inner tube (i.e. once any frangible connection has been broken).

It will be seen that regardless of the configuration of the slot, and hence recess, and guide element, the guide element may cooperate with the recess to guide movement of the product concealing tube relative to the inner tube in differing ways. Depending upon the configuration of the slot/recess and guide element, the guide element may be constrained such that it will engage a side edge of edges of the slot during retraction or extension of the product concealing tube relative to the inner tube to guide the relative movement, i.e. so as to define a predetermined path for extension or retraction. In other arrangements, the periphery of the slot/recess may simply define a boundary within which the guide element may move, thus defining a maximum extent of the relative movement of the product concealing tube relative to the inner tube in various directions.

The guide element may be of any suitable form. The guide element forms a projection on the outer surface of the inner tube once bonded thereto. The guide element may be in the form of a lug. The lug may be e.g. circular, oval or wedge shaped in shape, or of any desired shape.

In other embodiments the guide element may be an elongate member which extends over any suitable portion of the length of the slot in the second blank, such as at least 50% of the length of the slot or at least 75% of the length of the slot, and optionally over the entire length of the slot in the second blank. In the second blank the guide element may extend from an end of the slot which lies closest to the second edge of the blank and which will define a distal end edge of the product concealing tube toward an opposite end of the slot, optionally over the full length of the slot. Thus the guide element is in such a position when frangibly connected to the periphery of the slot in embodiments in which it is frangibly connected to the periphery of the slot. The guide element may not extend beyond an end of the slot at the edge of the second blank which will provide the proximal end edge of the product concealing tube.

Where the guide element is an elongate guide element, the guide element may extend along a helical path once bonded to the exterior of the inner tube.

Whatever the form of the guide element, the guide element may be located at an end of the slot in the second blank, and may be frangibly connected to the periphery of the slot in the second blank at an end of the slot. The end of the slot may be an end which is located at the distal end of the product concealing tube once the second blank has been wrapped around the inner tube to provide the product concealing tube. Where the guide element is an elongate element, it is envisaged that a frangible connection may be provided at both ends of the slot. Where the slot extends to an edge of the second blank, preferably the elongate guide element does not extend beyond the end of the slot at the edge of the second blank.

Preferably the entirety of the guide element is disposed within the slot in the second blank.

Where the slot extends to an edge of the second blank e.g. the edge that will provide a proximal end of the product concealing tube, the second blank may comprise formations for providing a stop mechanism which prevents the product concealing tube from being completely removed from the inner tube in the resulting dispenser.

The stop mechanism may comprise stop formations formed on the slot and the guide element respectively. Where the slot extends to the edge of the second blank which provides the proximal end of the product concealing tube, the stop mechanism may comprise stop formations formed on the end of the slot closest to the edge which provides the proximal end of the product concealing tube and the end of the guide element closer to the edge which provides the distal end of the product concealing tube respectively. The stop formations may comprise a single tab formed on one side of the slot and a cooperating single tab formed on the same side of the guide element. Such arrangements are advantageous in that they may allow an entire edge of the guide element to engage with an entire edge of the slot (and hence of the recess defined by the slot) during use.

In accordance with the invention in any of its aspects or embodiments, the guide element may be, and preferably is frangibly connected to the material of the second blank surrounding the slot.

In such embodiments the guide element is frangibly connected to the periphery of the slot (which will define a boundary of the recess in the product concealing tube). The guide element may be frangibly connected to the periphery of the slot at any location or locations around the periphery of the slot, and may include locations along a side edge or edges, or an end edge, or combinations thereof, where the slot is considered to have side and end edges. Such side and end edges may be considered to form portions of the overall periphery of the slot. For example, the guide element may be frangibly connected to an end edge and optionally the side edges of the slot. The frangible connection may thus be provided at one or more locations around the periphery of the slot, which may be continuous or discontinuous. The most appropriate locations(s) will depend upon the configuration of the slot and guide element.

The frangible connection between the guide element and the edge of the slot may be provided by one or more frangible bridges. The strength of the frangible connection may be selected as desired, e.g. depending upon the forces expected to be experienced during wrapping of the product concealing tube, and at what stage it is intended for the frangible connection to be broken.

In the second blank, whether or not a frangible connection between the guide element and periphery of the slot is provided, a portion of an edge of the guide element is contiguous with a portion of an edge of the material of the second blank defining a periphery of the slot. In accordance with the invention in any of its aspects or embodiments, a boundary between a portion of an edge of the guide element adjacent a periphery of the slot and the material of the second blank surrounding the slot may be defined by a outline. The cutline separates the material of the guide element from the material of the second blank surrounding the slot. In embodiments in which the guide element is initially connected to the periphery of the slot by one or more frangible bridges, the cutline may be formed from one or more cutline portions initially separated by the frangible bridges.

At least a portion of the guide element remains within the slot during wrapping of the second blank around the inner tube and subsequently in all operational states of the dispenser, Depending upon the configuration of the guide element, the entire guide element may remain within the slot during wrapping of the second blank around the inner tube and also in all operational states of the dispenser, or a greater portion of the guide element e.g. the entire guide element may be located within the slot when the product concealing tube is in a fully retracted position relative to the inner tube than when the product concealing tube is in a fully extended position relative to the inner tube. Such arrangements may occur where the slot extends to a proximal edge of the product concealing tube and an elongate guide element is used.

In a dispenser obtained in accordance with the invention, the product concealing tube is movable relative to the inner tube between an extended position for covering a product stick supported by the inner tube and a retracted position for exposing a product stick supported by the inner tube. Such movement is caused in use by a manual force exerted by a user. The product concealing tube may be movable relative to the inner tube between fully extended and fully retracted positions, corresponding to the maximum extent to which the product concealing tube may be extended or retracted relative to the inner tube respectively. The product stick thus remains static and is selectively exposed by movement of the product concealing tube of the dispenser.

The extent of available travel between the product concealing tube and the inner tube may be controlled by cooperation between the guide element and the recess provided by the slot. As described above, the guide element may abut an end of the recess or a stop associated with an end of the recess in order to limit axial travel of the product concealing tube relative to the inner tube in a given direction.

The guide element becomes bonded to the exterior surface of the inner tube. Thus, in use, the guide element and inner tube will be static and the recess is moved relative to the guide element and inner tube as the product concealing tube is moved relative to the inner tube.

The dispenser preferably further comprises an outer tube, wherein the product concealing tube is located (radially) between the inner and outer tubes. The product concealing tube then provides an intermediate tube located between the inner and outer tubes. The product concealing tube is arranged radially inwardly of the outer tube, whereby the product concealing tube is sandwiched radially between the inner tube and the outer tube. This may allow for precise guidance of the product concealing tube.

The outer tube may be made from a paper-based or card-based material such as paperboard or cardboard. The outer tube provides a surface which may form an exterior surface of the dispenser, and may be imparted with a desired finish or decoration to provide the dispenser with an attractive appearance, or to impart information to a user.

Where the outer tube is provided, the product concealing tube then provides an intermediate tube located between the inner and outer tubes. The intermediate product concealing tube is movably e.g. slidably and preferably both rotatably and slidably received within the outer tube, and projects upwardly from the outer tube. The inner tube is not movable i.e. is fixed relative to the outer tube.

As the product concealing tube is retracted or extended relative to the inner tube, the product concealing tube moves into or out of the space between the inner tube and outer tube. A greater extent of the product concealing tube is located in the space between the inner tube and outer tube when the product concealing tube is in a retracted position for exposing a product stick than when in an extended position for covering a product stick.

The guide element is fixed with respect to the inner (and where provided, outer tubes) and is received in the recess of the product concealing tube such that movement of the product concealing tube relative to the inner tube will move the recess along the guide element thereby retracting or extending the product concealing tube relative to the inner tube (and, where provided, the outer tube) to expose or cover the product stick.

The method may comprise providing a third blank of sheet material for providing the outer tube, and winding the third blank around a mandrel to provide the outer tube. The mandrel may be a different e.g. larger diameter mandrel than the mandrel about which the inner tube (and optionally product concealing tube) is wound. The method may then comprise removing the outer tube from the mandrel and disposing the inner tube and product concealing tube sub-assembly within the outer tube. The method may comprise removing the inner tube and product concealing tube sub-assembly from the mandrel used in wrapping the second blank around the inner tube to form the product concealing tube prior to disposing the inner tube and product concealing tube sub-assembly within the outer tube.

The outer tube is preferably fixed relative to the inner tube. Thus the outer tube is not movable relative to the inner tube. The outer tube then facilitates operation of the device by a user, and may be grasped by the user such that they may operate the dispenser by moving e.g. twisting the product concealing tube relative to the outer tube (once any frangible connection between the guide element and the slot has been broken).

The method may further comprise fixing e.g. bonding the outer tube relative to the inner tube. Such fixation is achieved in a manner to still permit movement of the product concealing tube relative to the outer tube and the inner tube. The fixation may be provided at a proximal end of the dispenser. For example, a base component may be provided at a proximal end of the dispenser joining the outer tube to the inner tube. The base component may be a closure plug or disc. A closure component e.g. disc or plug may be bonded to the proximal ends of the inner tube and outer tube to thereby fix the closure component to the inner tube and outer tube and thus fix the inner and outer tubes with respect to one another. Where a closure disc is used, the proximal end of the outer tube may be rolled inwardly to provide a lip for retaining the closure disc. The base component is preferably made from a paper-based or card-based material.

In embodiments the dispenser thus preferably further comprises an outer tube, wherein the product concealing tube is located between the inner and outer tubes, and the outer tube is fixed relative to the inner tube. The method may comprise providing a third blank of sheet material for providing the outer tube, and wrapping the third blank around a mandrel to provide the outer tube, and locating the inner tube and product concealing tube sub-assembly within the outer tube, and fixing the outer tube relative to the inner tube such that the outer tube is not movable relative to the inner tube. The outer tube may be fixed relative to the inner tube using a base component at a proximal end of the dispenser.

The outer tube may extend over a portion of the inner tube which projects from a proximal end of the product concealing tube when in a fully retracted position relative to the inner tube. The distal end of the product concealing tube may be arranged to project from the distal end of the outer tube in all operational states of the dispenser including when the product concealing tube is in a fully retracted position relative to the inner tube to enable the product concealing tube to be grasped by the user and moved relative to the outer tube.

The product concealing tube preferably projects from the inner tube (and, where provided outer tube) in all operative positions. This may help to protect the product stick, and may facilitate grasping by a user.

Where a third blank is used to provide an outer tube, the third blank may comprise first and second opposed edges for providing proximal and distal end edges of the outer tube, the first and second edges being connected by at their respective ends by opposed third and fourth edges.

The first edge of the third blank may comprise a step along the length thereof, so as to define a first portion and a second portion recessed therefrom. The first portion may be closer to the fourth edge and the second portion closer to the third edge. The first portion may define an outer winding of the outer tube projecting relative to an inner winding provided by the second portion. This may assist with rolling in the proximal end of the outer tube, reducing the thickness of the material to be rolled inwardly e.g. such that only a single ply provided by the portion of the third blank inboard of the first portion of the first edge needs to be rolled inwardly. Such a configuration is optional, and it will be understood that it is not necessary for the outer tube proximal end to necessarily be rolled inwardly for cooperation with a closure disc. For example, a closure plug may be used or any suitable form of end closure.

The third edge provides a leading edge of the third blank as it is wrapped around the mandrel to provide the outer tube, and the fourth edge a trailing edge of the third blank. Preferably the third edge is connected to the first edge so as to define an angle other than 90 degrees with the first edge and is connected to the second edge so as to define an angle other than 90 degrees with the second edge. The third edge may be a straight edge. In other words, the third edge may be non-perpendicular to both of the first and second edges. The third edge may then provide a bevelled edge of the third blank. Thus, in these embodiments, rather than extending perpendicular to both the first and second edges, the third edge connecting the first and second edges is a sloping i.e. bevelled edge. The fourth edge i.e. the trailing edge may or may not be shaped in the same manner as the third edge.

In embodiments, the third edge defines an angle of less than 90 degrees, e.g. less than 80 degrees or less than 70 degrees with respect to one of the first and second edges e.g. the second edge, and/or of at least 30 degrees or at least 40 degrees. Alternatively or additionally, the third edge may define an angle with respect to the other one of the first and second edges e.g. the first edge of greater than 90 degrees, and no more than 160 degrees or no more than 150 degrees or no more than 140 degrees and/or of at least 100 degrees.

As described in relation to the first and second blanks, by providing a third edge which is angled with respect to the first and second edges in this manner, the lap seam created by the overlap between the respective edge and an overlying winding of the third blank as a result of wrapping the blank around the mandrel to produce the outer tube may be spread around the circumference of the resulting tube to a greater extent than would be the case if the third edge were perpendicular to both the first and second edges.

The third edge may provide a helically extending seam with an adjacent (i.e. outer) winding of the product concealing tube in the formed (wrapped) tube. The seam is located to the interior of the formed tube.

In some exemplary embodiments, the fourth edge of the third blank defines an angle of 90 degrees with at least one of the first and second edges e.g. the second edge where it is connected thereto so as to provide a "straight", non-angled edge, which may assist in maximising an available seam free area of the exterior surface. The exterior surface of the outer tube may form part of an exterior surface of the dispenser visible to a user, and it may be desired to print or otherwise decorate the surface. The fourth edge may also define an angle of 90 degrees with the other of the first and second edges e.g. the first edge, or may define an angle other than 90 degrees therewith, such as less than 90 degrees. The first edge may comprise a portion extending parallel to the second edge, and a further portion adjacent the fourth edge and connecting the first portion of the first edge to the fourth edge, wherein the further portion of the first edge defines an angle other than 90 degrees with the said portion of the first edge which extends parallel to the second edge and an angle other than 90 degrees with the fourth edge. The third blank may therefore comprise a chamfered region at a transition between the first edge and the fourth edge. A chamfered region may additionally or alternatively be provided at the transition between the second edge and fourth edge.

It will be appreciated that one or more of the corners of the third blank may be rounded. In these cases, the rounding at the corner is disregarded when determining the angle between the sides which are connected to one another at that corner, and the general path of the sides approaching the corner is considered. For example, a leading corner of the blank may be rounded to facilitate processing e.g. to reduce the risk of the corner being buckled when fed around the inner tube.

In embodiments the third blank may comprise first and second opposed edges for providing proximal and distal end edges of the outer tube, the first and second edges being connected at their respective ends by opposed third and fourth edges, wherein the third edge provides a leading edge of the third blank as it is wrapped around the mandrel to provide the outer tube, and the fourth edge a trailing edge of the second blank, wherein the third edge is connected to the first edge so as to define an angle other than 90 degrees with the first edge, and is connected to the second edge so as to define an angle other than 90 degrees with the second edge so as to provide a sloping leading edge of the blank.

A region of the second and/or third blank adjacent the fourth i.e. trailing edge thereof may be of lesser thickness than a remainder of the blank. This may provide a "skived" region of lesser thickness reducing the perceived bulkiness of the tube. The skived region reduces the overall thickness of the overlapping windings of the blank adjacent the trailing edge in the region which may be visible from the exterior of the resulting tube. The skived region may result in a seam being provided that is substantially flush at the exterior of the resulting tube.

The third blank may be a blank of paper-based or card-based material, such as paperboard or cardboard. The third blank may be a single piece blank.

The dispenser may further comprise a removable cap, and the method may extend to the step of providing a removable cap. The dispenser may comprise a base part comprising the inner tube and product concealing tube disposed outwardly of the inner tube, and, where provided, the outer tube disposed outwardly of the product concealing tube; and the removable cap. The exterior circumferentially extending surfaces of the base part and removable cap may be flush with one another when the cap is located over the base part. An edge of the cap may abut a distal edge of the outer tube. The exterior circumferentially extending surface of the base part may be provided by the exterior circumferentially extending surface of the outer tube, where provided. The removable cap may be locatable over the base part with the edge of the cap abutting a distal edge of the outer tube when the product concealing tube is in both fully extended and fully retracted positions relative to the inner tube.

Where a removable cap is provided, the method may further comprise providing a fourth blank of sheet material for providing a main body of the cap, and wrapping the fourth blank around a mandrel to provide the main body of the cap. The same mandrel as used in providing the outer tube may be used, or a different mandrel may alternatively be used. The method may comprise closing an open end of the main body of the cap. Any suitable closure e.g. an end plug or end disc may be used. The edge of the tube providing the main body of the cap may be rolled inwardly to provide a lip for locating an end closure disc.

The fourth blank may be a single piece blank.

The fourth blank may be a blank of paper-based or card-based material, such as paperboard or cardboard.

The blank for providing the main body of the removable cap may be of a similar configuration to that for providing the outer tube. A step may be provided along an edge of the blank which is to provide an edge of the main body which is to be rolled inwardly in embodiments where this is carried out.

The present invention extends to an assembly comprising the dispenser and a product stick mounted thereto, the product stick being supported by the inner tube and extending from a distal end of the inner tube. The product stick is mounted to the dispenser so as to be fixed relative to the inner tube. In this way, movement of the product concealing tube relative to the inner tube will correspond to movement of the product concealing tube relative to the product stick.

The product stick is arranged radially inwardly of the inner tube and projects upwardly (distally) beyond a distal end of the inner tube. Where an outer tube is provided, the product stick is also arranged radially inwardly of the outer tube and projects upwardly beyond a distal end of the outer tube.

The method may further comprise the step of mounting a product stick to the dispenser. The product stick is mounted such that it is supported by the inner tube and extends from a distal end of the inner tube. The product stick may be mounted to the inner tube. This may provide a more efficient arrangement, reducing the number of components required. The inner tube acts as a product stick carrier. The product stick may be mounted to a distal end of the inner tube. This may maximise the amount of the product stick which may be exposed for use, reducing wastage of the product. The product stick may be mounted to the distal end of the inner tube such that a base of the product stick is recessed from the distal tip of the inner tube. This may provide some support to the sides of the product stick at the proximal end thereof, improving security of the attachment between the inner tube and product stick. However, it is envisaged that the product stick need not be mounted to the distal end of the inner tube, and may extend some way into the inner tube toward the proximal end thereof. For example, the product stick could even be mounted to a closure e.g. base disc or end plug at a proximal end of the inner tube.

Mounting of the product stick to the inner tube may be achieved by any suitable means e.g. using a bonding agent, a friction fit, a mechanical interlocking arrangement or even a magnetic arrangement. For example, a wax bonding agent may be used. It is envisaged that the product stick could be mounted to the inner tube so as to be supported thereby using an additional component e.g. a closure component closing the distal end of the inner tube, such as a closure plug or disc, (or indeed a closure component closing a proximal end of the inner tube). The closure component is mounted to the inner tube e.g. to a distal end thereof. The closure components may be bonded to the inner tube. The product stick may be bonded to the closure component e.g. using a bonding agent, such as wax. However, in some embodiments the exterior of the product stick is directly bonded to the interior of the inner tube e.g. the distal end thereof.

The method may comprise locating a removable cap, where provided, over the exposed end of the product stick.

The present invention extends to a dispenser obtained by a method in accordance with the invention in any of its aspects or embodiments described herein.

In order to avoid excessive thickness of the tubes, the first and second blanks, and where applicable, the third blank and/or fourth blank may be wrapped such that the resulting tube has a maximum thickness of no more than two plies of the material of the blank from which it is formed.

Thus, in embodiments, any one or ones of the inner tube, product concealing tube, and, where applicable, outer tube and/or cap have a thickness of no more than two plies of the material of the blank from which they are formed.

Preferably each of the inner tube and product concealing tube, and, where provided outer tube and/or cap, are made from a paper-based or card-based material such as paperboard or cardboard. This facilitates recycling of the dispenser after use. Advantageously each component of the dispenser is of a paper-based or card-based material.

The present invention extends to a dispenser obtained in accordance with the method in any of the aspects or embodiments described herein, and to an assembly comprising the dispenser and a product stick mounted thereto, the product stick being supported by the inner tube and extending from a distal end of the inner tube.

In accordance with a further aspect of the invention there is provided a dispenser for a product in stick form, the dispenser comprising an inner tube and a product concealing tube disposed outwardly of the inner tube, wherein the product concealing tube is retractable and extendable relative to the inner tube for exposing and covering a product stick extending from a distal end of the inner tube in use;

wherein the product concealing tube comprises a recess in an interior surface thereof and the inner tube comprises a guide element bonded to an exterior surface thereof, the product concealing tube being movable relative to the inner tube with the guide element cooperating with the recess for guiding the movement of the product concealing tube relative to the inner tube.

It is believed that a dispenser of this construction is advantageous in its own right, whether or not it is obtained according to the methods described herein. For example, such a dispenser could alternatively be obtained using tubes obtained in any manner e.g. spiral wound tubes for the inner tube and product concealing tube. A recess may be provided in an inner surface of the product concealing tube, such as by machining, and a guide element bonded to the outer surface of the inner tube. The product concealing tube may then be mounted over the inner tube with the guide element disposed within the recess to provide a dispenser operating in the manner described in relation to the earlier embodiments obtained in accordance with the methods described herein. Thus the resulting dispenser may include any of the features and operate in any of the manners described herein in relation to the dispenser obtained in accordance with the methods described, differing only in the manner in which the product concealing tube, inner tube, recess and guide element are provided.

The dispenser is of the same general type as described in relation to the earlier aspects, having a product concealing tube which is retractable and extendable relative to the inner tube for exposing or covering the product stick. The product concealing tube is movable relative to the inner tube between an extended position for covering a product stick supported by the inner tube and a retracted position for exposing a product stick supported by the inner tube. Such movement is caused in use by a manual force exerted by a user. The product concealing tube may be movable relative to the inner tube between fully extended and fully retracted positions, corresponding to the maximum extent to which the product concealing tube may be extended or retracted relative to the inner tube respectively. The product stick thus remains static and is selectively exposed by movement of the product concealing tube of the dispenser.

The product concealing tube may be movable between a fully extended, and a fully retracted position relative to the inner tube. The fully extended and fully retracted positions refer to the maximum available extended and retracted positions of the product concealing tube relative to the inner tube in the dispenser. The maximum available extended and retracted positions may e.g. be as permitted by the cooperation of the guide element with the recess.

The extent of available travel between the product concealing tube and the inner tube may be controlled by cooperation between the guide element and the recess provided by the slot. As described above, the guide element may abut an end of the recess or a stop associated with an end of the recess in order to limit axial travel of the product concealing tube relative to the inner tube in a given direction.

The present invention in this further aspect may include any or all of the features described in relation to the earlier aspects and embodiments of the invention.

For example, the dispenser may include any of the following features alone or in any combination;

The guide element may be directly bonded to the exterior surface of the inner tube.

The inner tube and product concealing tube may each be formed from a respective blank, optionally a single piece blank. However, alternatively they may be obtained in other manners. For example, the inner tube and product concealing tube may each be a spiral wound tube.

The side edges of the recess may diverge from one another with distance from an end thereof. The side edges of the recess may diverge with one another in a manner such that the width of the recess exceeds a width of the guide element over at least a portion of the length of the recess. The recess may be wedge shaped e.g. teardrop shaped. The side edges of the recess may diverge from one another from a closest spacing corresponding substantially to a width of the guide element extending therebetween at the end of the recess. Arrangements in which the side edges of the recess diverge over at least a portion of a length of the recess may facilitate operation of the dispenser, and enhance ease of movement of the product concealing tube relative to the inner tube.

In other embodiments the side edges of the recess may extend parallel to one another. In some embodiments the recess is of substantially uniform width, and a greatest width of the guide element corresponds substantially to a width of the recess, wherein the guide element is snugly received between the side edges of the recess along the entire extent of the relative movement available between the guide element and the recess.

Whatever the shape of the recess, the side edges of the recess may each extend along a helical path.

The guide element may be in the form of a lug.

The recess may comprise side edges and opposed end edges, the end edges being spaced from the proximal and distal end edges of the product concealing tube.

The recess may be provided by a slot in a blank used to provide the product concealing tube. The slot may be covered by an outer winding of the blank to provide a recess which does not extend through the full thickness of the wall of the product concealing tube. However, alternatively it may be machined into an inner surface of the product concealing tube. The recess preferably does not then extend through the full thickness of the wall of the product concealing tube, although it could, in some embodiments, define a slot extending through the full thickness of the wall. Thus, in embodiments, however the product concealing tube and recess are provided, the recess preferably does not extend through the full thickness of the wall of the product concealing tube.

The dispenser may further comprise an outer tube, wherein the product concealing tube is located between the inner and outer tubes, and the outer tube is fixed relative to the inner tube. The outer tube may be made of paper-based or card-based material, such as paperboard or cardboard.

The inner tube and product concealing tube may each be made of paper-based or card-based material, such as paperboard or cardboard.

The dispenser may further comprise a removable cap, optionally wherein the removable cap is made of paper-based or card-based material, such as paperboard or cardboard.

An outer package e.g. carton may be provided for the dispenser.

The invention extends to an assembly comprising the dispenser of the further aspect of the invention in accordance with any of its embodiments, and a product stick mounted thereto, the product stick being supported by the inner tube and extending from a distal end of the inner tube.

In accordance with the invention in any of its aspects or embodiments, the product stick may be a stick of any product that may be provided in stick form. The product stick is a stick of solid material. The product may be any consumer product. The product may be a personal care product, such as a cosmetic product, skin care product, hair care product, or toothcare product, but is not limited thereto. A personal care product includes any product used in grooming or dressing, as well as products used at other times, and may include products for providing a medicinal benefit. The product is not limited to personal care product, and may be any type of consumer product that is provided in stick form, such as a stick of adhesive, or paint. The product stick may be selected from any one of; a stick of cosmetic, lipstick, lip balm, deodorant, adhesive product or of any product for topical application to a surface, for example to a person's skin or lips.

BRIEF DESCRIPTION OF DRAWINGS

Some embodiments of the invention will now be described by way of example only with reference to the accompanying drawings in which.

DETAILED DESCRIPTION

Figure 2:
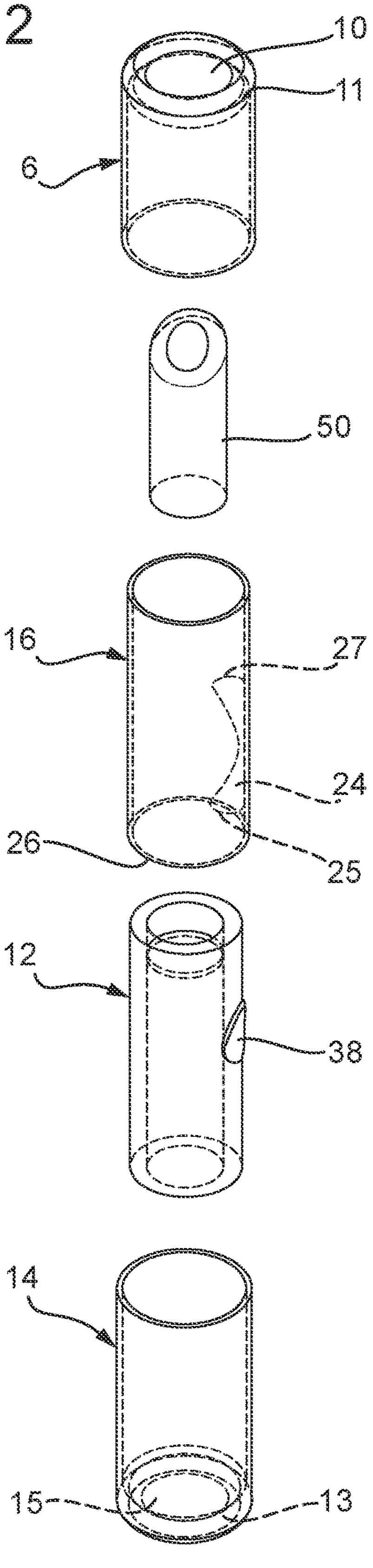
FIG. 2 is an exploded view showing the components of the dispenser of FIG. 1.
Figure 1:
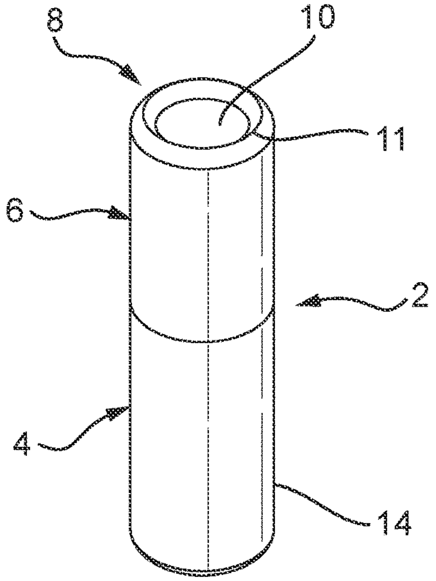
FIG. 1 shows a dispenser in accordance with the invention with a removable cap in place.

With reference to FIGS. 1 and 2 a dispenser 2 for a product in stick form is shown.

References to the proximal and distal end of the outer tube, inner tube and product concealing tube respectively may correspond to the ends which will typically be lowermost and uppermost in use. Thus, the proximal and distal ends of a tube may be interchangeably referred to as the lower and upper ends thereof. The proximal and distal ends of a component may also be referred to as the first and second ends thereof.

The dispenser 2 comprises a base part 4 and a removable cap 6. In this embodiment, the base part 4 and cap 6 are tubular in shape. They may for example be circular in cross section, although other cross sectional shapes may be possible.

The cap 6 is made from a paper-based or card-based material such as paperboard or cardboard. Its upper (or distal) end 8 may be closed by a disc 10 of such a material in a conventional manner which locates against a rolled over lip 11 formed at the upper end 8. The disc 10 may be a laminated structure, for example comprising a plurality of layers of card material bonded together, or a unitary, one piece construction. The disc 10 could of course be located in some other manner. In another embodiment, for example the upper end 8 of the cap 6 need not be rolled and an end closure in the form of a plug may be inserted into the upper end of the cap and bonded into position.

The base part 4 comprises an outer tube 14 which is made from a paper-based or card-based material such as paperboard or cardboard. The outer tube 14 is of a wrapped tube construction formed in a manner later described, and is not spirally wound.

As shown in the embodiment, the cap 6 lies flush with the outer tube 14. The cap 6 is, similar to the base part 4, formed of a wrapped tube construction, rather than being spirally wound.

The dispenser is shown n exploded form in FIG. 2, which better illustrates the components of the base part.

The base part 4 further includes a product concealing tube 16 which is rotatably and slidably received within the outer tube 14. The product concealing tube 16 is also made from a paper-based or card-based material such as paperboard or cardboard, and is of a wrapped tube construction, rather than being spirally wound.

The base part further comprises an inner tube 12 formed of a paper-based or card-based material which supports a product stick 50. The inner tube 12 provides a product stick carrier. The inner tube 12 is fixed at its base to the outer tube 14.

The inner tube 12 is formed of a wrapped tube construction, rather than being spirally wound. A proximal or lower end of the inner tube may be closed by an end closure, such as a disc or plug, which may be formed of a paper-based or card-based material. A disc may be of a laminated structure, for example comprising a plurality of layers of card material bonded together, or a unitary, one piece construction. The disc or plug may be bonded to the proximal end of the inner tube 12 e.g. using adhesive. As described with reference to the outer tube 14, the proximal end of the inner tube 12 may be rolled inwardly as shown in the illustrated embodiment. A closure disc 15 may then be located against the lip 13 formed by the inwardly rolled end of the inner tube. In other embodiments, an end plug may be inserted into the proximal end of the inner tube, and may be bonded in place, without inward rolling of the end of the inner tube 12.

A guide element 38 in the form of a lug made from a paper-based or card-based material such as paperboard or cardboard is bonded to the outer surface of the inner tube 12. The guide element 38 is received in a helical recess 24 in the interior surface of the product concealing tube 16 such that relative rotation of the product concealing tube 16 and the outer tube 14 (and inner tube 12) will move the recess 24 along the guide element 38 thereby lowering or raising the product concealing tube 16, as will be described further below. As described further below, the guide element was provided as part of the blank for the product concealing tube 16, being frangibly connected to the periphery of the slot in the blank which provides the recess 24 in the interior surface of the product concealing tube 16. The dispenser is shown in the embodiment of FIGS. 1-6B in the configuration which arises after breaking of the frangible connection between the guide element 38 and the slot, enabling the product concealing tube 16 to move relative to the inner tube 12, with the recess 24 moving relative to the guide element 38 which is fixed to the inner tube 12.

Figure 3:
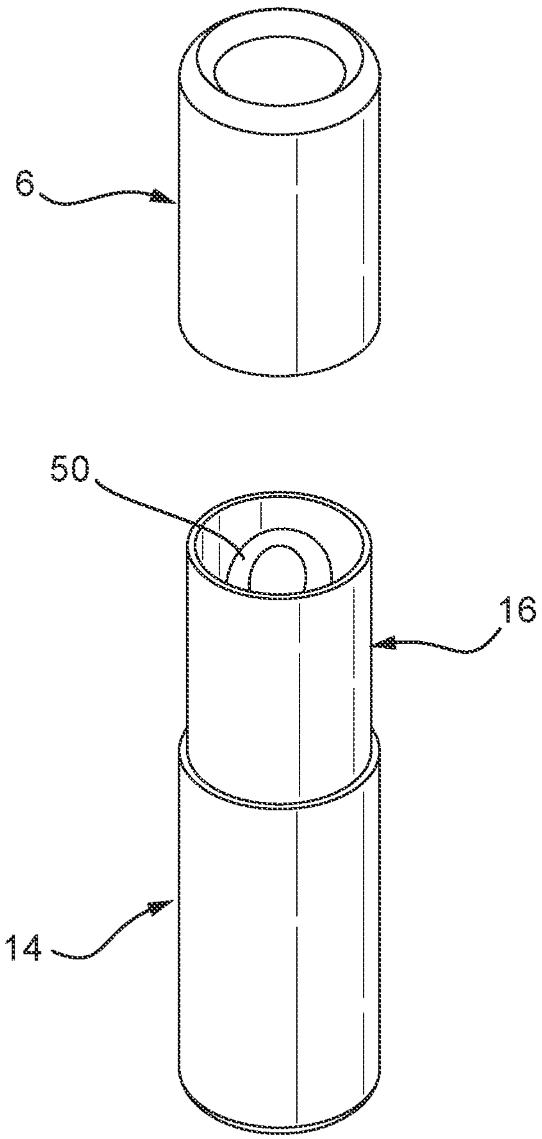
FIG. 3 shows the dispenser of FIG. 1 with its cap removed and the product concealing tube in a fully extended position covering the product stick.

FIG. 3 illustrates the dispenser as shown in FIG. 1 when the cap 6 has been removed, and with the product concealing tube 16 in a fully extended position relative to the outer tube 14 (and inner tube 12). In this position, the product concealing tube 16 covers the product stick 50.

Figure 4A:
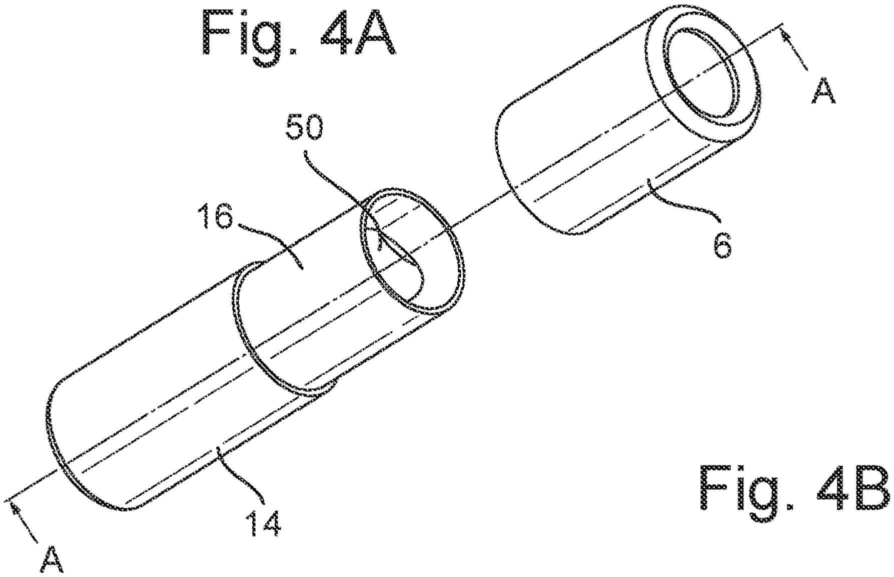
FIG. 4A is a perspective view showing the dispenser of FIG. 1 with its cap removed and the product concealing tube in a fully extended position covering the product stick.
Figure 4B:
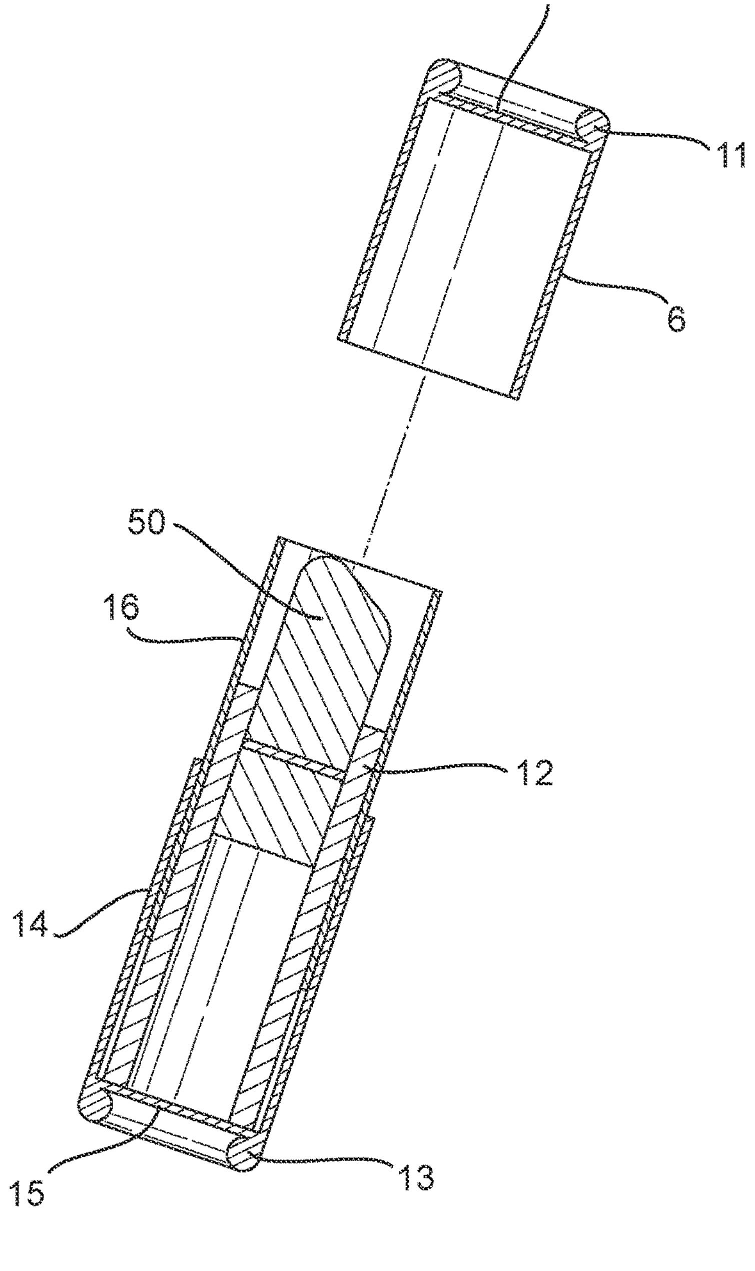
FIG. 4B is a sectional view along the line A-A of FIG. 4A.

FIG. 4A is similar to FIG. 3, being a perspective view of the dispenser with the cap removed and the product concealing tube 16 in a fully extended position. FIG. 4B is a section taken along the line A-A of FIG. 4A.

As may be seen in more detail in FIG. 46, the bottom (proximal) end of the outer tube 14 is rolled inwardly to provide a lip 13 for locating a base closure disc 15. This is a similar construction to the closed end of the cap 6, described above. The base disc 15 could of course be located in some other manner. In another embodiment, for example the lower end of the outer tube 14 need not be rolled and the base disc 15 may simply be bonded in position. The base disc 15 may be formed of a paper-based or card-based material. The base disc 15 may be of a laminated structure, for example comprising a plurality of layers of card material bonded together, or a unitary, one piece construction.

In the illustrated embodiment, the base closure disc 15 is bonded to a bottom (proximal) end of the inner tube 12 to thereby fix the outer tube 14 in relation to the inner tube 12. However, in particular where the end of the outer tube 14 is not inwardly rolled, any suitable arrangement may be used to close the end of the outer tube and to fix the outer tube relative to the inner tube. For example, a closure plug may achieve this effect without inward rolling, or another arrangement may be used. The outer tube is advantageously fixed to the inner tube at the base of the tubes to avoid interfering with movement of the product concealing tube.

The product concealing tube 16 is able to move in the space defined between the inner and outer tubes between its fully extended and fully retracted positions relative to the inner tube 12 and outer tube 14, and also the product stick 50.

In the configuration shown in FIGS. 3, 4A and B, it may be seen that the product concealing tube 16 covers the product stick i.e. the sides thereof.

Figure 5:
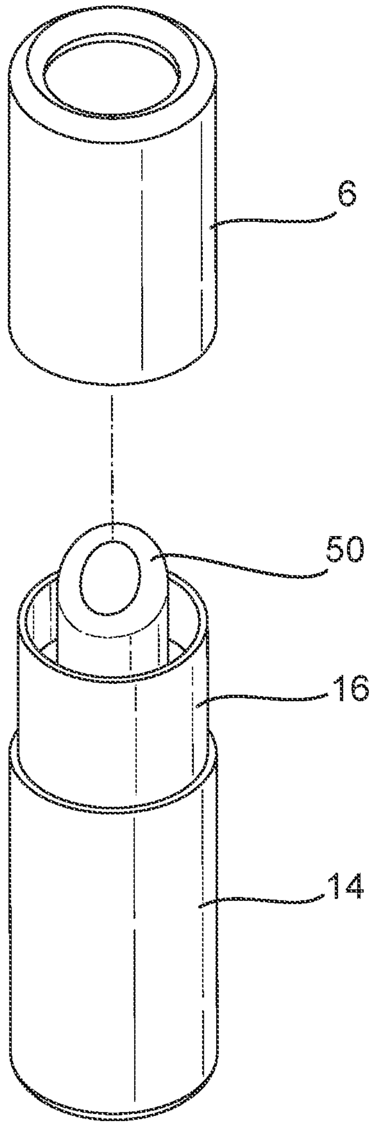
FIG. 5 shows the dispenser of FIG. 1 with its cap removed and the product concealing tube in a fully retracted position exposing the product stick.

FIG. 5 illustrates the dispenser as shown in FIG. 1 when the cap 6 has been removed, and with the product concealing tube 16 in a fully retracted position relative to the outer tube 14 (and inner tube 12). In this position, the product concealing tube 16 exposes the product stick 50.

Figure 6A:
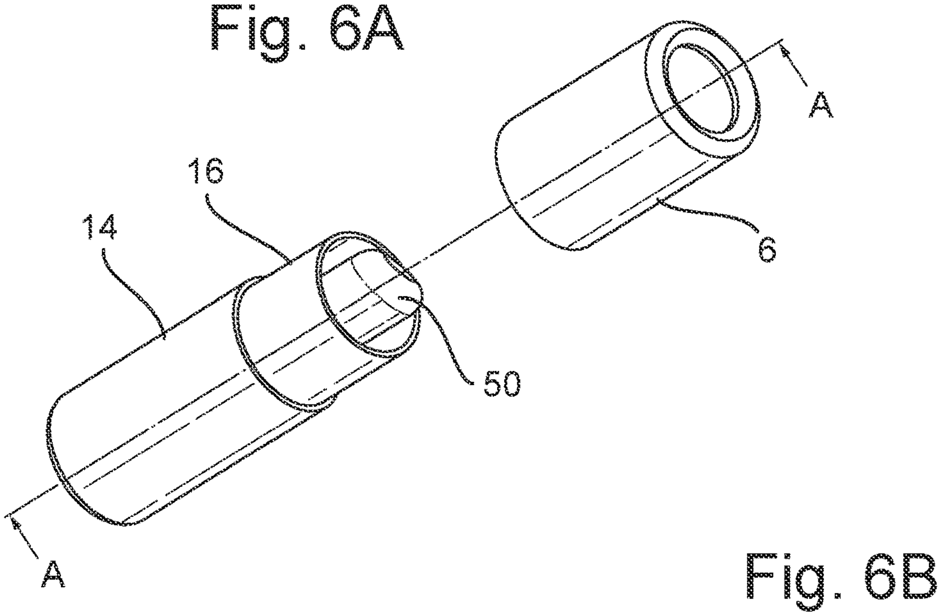
FIG. 6A is a perspective view showing the dispenser of FIG. 1 with its cap removed and the product concealing tube in a fully retracted position exposing the product stick.

FIG. 6A is similar to FIG. 5, being a perspective view of the dispenser with the cap removed and the product concealing tube 16 in a fully retracted position. FIG. 68 is a section taken along the line A-A of FIG. 6A.

In the fully retracted position, the product concealing tube 16 still projects upwardly from the upper i.e. distal end of the outer tube 14 and also from the upper i.e. distal end of the inner tube, but to a lesser degree than when in the fully extended position of FIGS. 3, 4A and 4B. In this way, the product is exposed for use.

As shown in FIG. 2, the product concealing tube 16 comprises an axially extending helical recess 24 formed in an interior surface thereof. The recess has an upper or distal end 27 and a lower or proximal end 25. This helical recess 24 is provided by a correspondingly shaped slot in the blank which has been used to form the product concealing tube 16, as described in more detail below. The slot is covered by an outer winding of the blank in providing the product concealing tube 16, so that it is not visible from the exterior of the tube. In this way, a recess corresponding to the shape of the slot in the blank is provided, which extends only partially through the thickness of the wall of the product concealing tube 16.

In this embodiment, and as can best be seen in FIG. 2, and in the view of the second blank for forming the product concealing tube 16 later described, the helical recess 24, (and thus the slot which defines the recess 24) does not extend to the proximal (i.e. lower) edge 26 of the product concealing tube 16.

The helical recess 24 may extend by any desired amount around the axis of the product concealing tube 16. The configuration of the helical recess e.g. the helix angle thereof will determine the degree of rotation required to extend or retract the product concealing tube by a predetermined amount.

The upper end of the helical recess 24 will be below the upper edge of the product concealing tube 16, but need not necessarily be below the upper edge of the outer tube when the product concealing tube 16 is in a fully retracted position.

As mentioned above, the inner tube 12 is rotationally and slidably fixed relative to the outer tube 14. For example, in the embodiment illustrated, this is achieved by bonding the outer tube 14 to a disc closing the proximal end of the inner tube 12. However, any suitable method may be used. The inner tube 12 projects upwardly beyond a distal end of the outer tube 14, and, in the embodiment illustrated, the inner tube 12 has a greater height than the outer tube 14.

Figure 6B:
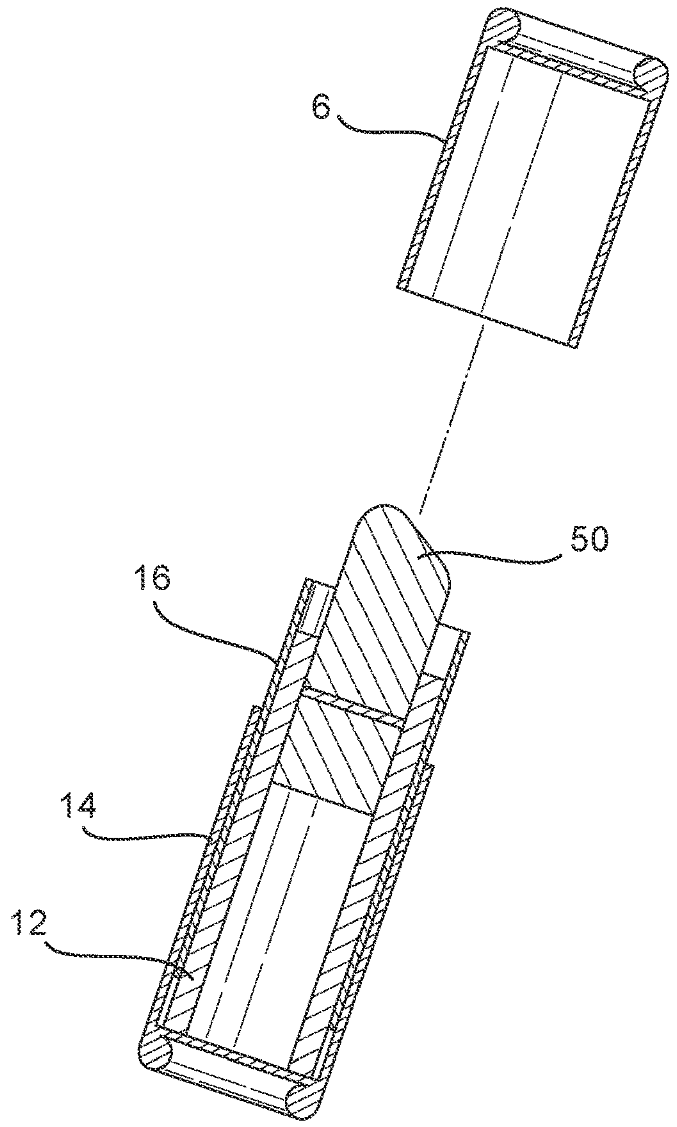
FIG. 6B is a sectional view along the line A-A of FIG. 6A.

The product stick 50 is arranged radially inwardly of the inner tube 16 and, in the embodiment shown, projects upwardly from the outer tube 14 in all operational states of the dispenser, as can be seen for example in FIGS. 5B and 6B. As the inner tube 12 is rotationally fixed to the outer tube 14, both it and the product stick 50 remain static during use of the dispenser 2. As will be described further below, raising or lowering of the product concealing tube 16 relative to the outer tube 14 due to relative rotation thereof guided by the movement of the helical recess 24 over the guide element 38 will therefore expose or cover the product stick 50.

The product stick may be secured to the inner tube 12 in any suitable manner. This may or may not involve the use of additional components. For example the product stick may be bonded to a carrier disc or plug formed of a paper-based or card-based material and bonded to a distal (upper) end of the inner tube 12. Such a carrier disc or plug may be located at the distal tip of the product stick or may be recessed therefrom to enable the distal end portion of the inner tube 12 to support the sides of the product stick at its base. In other embodiments, the product stick might be secured to the inner tube 12 using an interference fit, or a mechanical interlocking arrangement or using a magnetic coupling, for example. Any arrangement may be used which fixes the product stick relative to the inner tube 12, with the distal end of the product stick 50 extending beyond the distal tip of the inner tube 12 for access by the user when the product concealing tube 16 is in a retracted position. It is envisaged that the product stick could even be secured to a proximal end of the product stick e.g. using an end closure such as a carrier disc or plug as described above in relation to the distal end. However, the further the product stick extends into the inner tube 12, the greater the extent of the product stick which will not be available for use, and hence the greater the portion of the product stick which may be wasted. The product stick may be bonded to the inner tube 12 directly or indirectly (e.g. via a carrier, such as an end closure), using any suitable bonding agent e.g. adhesive, or wax, or a layer of the unset product itself.

The product concealing tube 16 is rotatably and slidably received over the inner tube 12. Thus, the product concealing tube 16 is radially sandwiched between the outer tube 14 and the inner tube 12. The inner tube 12 is arranged radially inwardly of the product concealing tube 16 with the guide 38 disposed in the recess 24 provided in the interior surface of the product concealing tube 16.

Having described the overall construction of the dispenser 2, its mode of operation will now be described.

Turning to operation of the dispenser 2, prior to first use, the dispenser 2 is in the closed configuration shown in FIG. 1.

To use the dispenser 2, the cap 6 is first removed, as shown in FIG. 3. It will be seen from this Figure that the product concealing tube 16 is in a fully extended position, and projects from the outer tube 14 and covers the product stick 50. The guide element 38 is disposed at the proximal (bottom) end 25 of the slot 24 in this position.

The product concealing tube 16 is then rotated relative to the outer tube 14. The user may grip the exposed section of the product concealing tube 16 and the outer tube 14 and simply twist. The relative rotation of the product concealing tube and the outer tube will cause the product concealing tube 16 to retract into the outer tube, thereby exposing the product stick 50. This is due to the interaction between the helical recess 24 on the product concealing tube 16 and the guide element 38 on the inner tube 12, which is rotationally fixed relative to the outer tube 14.

The product concealing tube 16 is retractable relative to the outer tube 14 to the fully retracted position shown in FIG. 5.

Relative rotation of the inner tube 16 and outer tube 18 to retract the product concealing tube 16 can continue until such time as the distal (upper) end 27 of the recess 24 engages the guide element 38. At this point, the product stick 50 is exposed to the fullest extent possible. This fully retracted position is shown in FIG. 5. The inner tube 16 need not of course be fully retracted for application of the product. The terms “fully extended” and “fully retracted” refer to the most fully extended and retracted positions of the product concealing tube relative to the inner tube and outer tube that are available, under the control of the cooperation between the guide element 38 and the recess 24.

The length of the helical recess 24 and the length of the guide element 38 and the helix angle of the recess 24 will determine how much rotation is required to fully retract the product concealing tube 16.

After application of the product, the product concealing tube 16 and outer tube 14 may be rotated in the opposite direction in order to extend the product concealing tube 16 further from the outer tube 14. The axial movement of the product concealing tube 16 will be limited by the engagement of the guide element 38 with the proximal end 25 of the slot 24. In this position, the product stick 50 will once more be fully covered and protected by the product concealing tube 16.

The cap 6 can then be replaced over the inner tube 16 to close the dispenser.

It should be noted that as shown in FIG. 5, a portion of the product concealing tube 16 still projects from the outer tube 14 even when the product concealing tube 16 is fully retracted. This means that the cap 6 may still be replaced on the dispenser 2 in that condition, and provide a portion of the product concealing tube which can be grasped to initiate rotation relative to the outer tube 12 when it is desired to extend the product concealing tube 16 once more.

The dispenser may initially be provided to the user in the configuration of FIG. 3 or 5, i.e. with the product concealing tube fully extended or retracted, as in both cases, the cap may fit over the product concealing tube and abut the upper or distal end of the outer tube 14.

It will be seen from the above description that a dispenser 2 in accordance with the invention operates in a manner such that rather than extending and retracting a product stick, the product stick is selectively exposed by the extension and retraction of a tubular shield relative to an outer tube. This may make the product easier to handle, provide greater stability to the product stick and allow the exposure of the product stick to be more finely controlled.

The dispenser 2 as described above is advantageous in that apart from the product stick 50, it may be and preferably is made entirely from a paper-based or card-based material. It will therefore be fully recyclable. At least the tubular elements and the guide element of the dispenser are preferably made from a paper-based or card-based material.

It will be understood that various modifications may be made to the embodiment disclosed without departing from the scope of the invention.

While the embodiment has been illustrated with respect to the case in which the product concealing tube 16 is both rotatably and slidably movable relative to the inner tube 12 and outer tube 14, it is envisaged that in other arrangements only linear movement between the product concealing tube and inner and outer tubes might be possible. Such arrangements might then use a recess in the interior surface of the product concealing tube 16 which extends along a direction parallel to an axis of the tube, and which has side edges extending in such a direction. The cooperation between the guide element and the recess will still control the movement of the product concealing tube 16 relative to the inner and outer tubes i.e. the extent of the available movement. In yet other arrangements, depending upon the configuration of the recess, the degree of rotation required to advance or retract the product concealing tube may differ from that illustrated.

Furthermore, while in the embodiment illustrated, the guide element 38 is snugly received in the recess 24, such that the recess and guide element cooperate with one another to define the path of possible movement of the product concealing tube relative to the inner tube, in other embodiments some latitude may be available in the lateral position of the guide element within the recess. The boundary of the recess may then cooperate with the guide element to guide the movement of the product concealing tube relative to the inner tube to the extent that it defines an area within which the guide element may move, with movement of the product concealing tube relative to the inner tube being possible in any manner provided that the guide element remains within the recess.

In yet other arrangements, it is envisaged that the outer tube 14 could be omitted. However, the use of an outer tube as shown may provide a neater and more attractive dispenser. The outer tube may cooperate with a removable cap to provide part of the exterior of the dispenser, and/or may be provided with an attractive decorative appearance e.g. by printing of the outer surface thereof.

The use of a removable cap is also optional.

A preferred embodiment of a method for forming the dispenser in accordance with the embodiment of FIGS. 1-6B will now be described.

First the blanks for the various components will be illustrated by reference to FIGS. 7A-D. It will be noted that FIG. 2 is a schematic representation of the exploded view of the dispenser, and some features are exaggerated. For example, the shape of the guide element and the configuration of the slot shown in FIG. 2 are schematic.

Each of the blanks shown in FIGS. 7A-D is provided by a single piece of card or paper based material e.g. paperboard or cardboard.

Figure 7A:
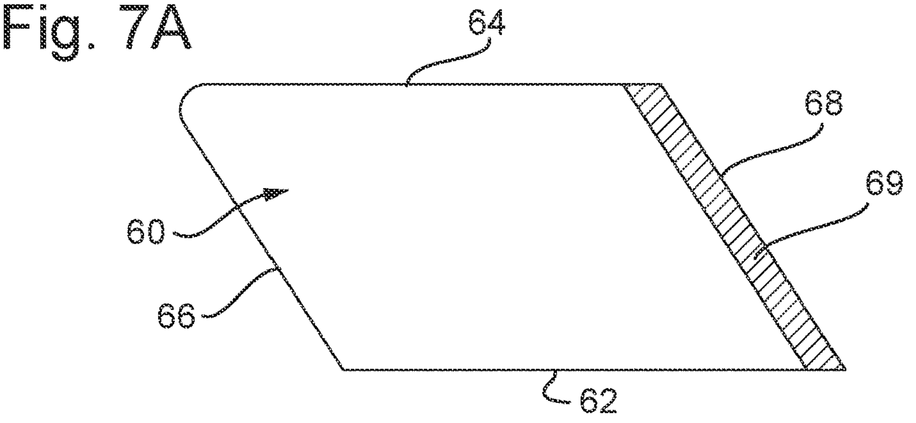
FIG. 7A illustrates a first blank for providing the inner tube of an embodiment of a dispenser in accordance with FIGS. 1-6B.

FIG. 7A illustrates a blank 60 in the flat for providing the inner tube 12 with the surface will define an outer surface of the inner tube uppermost. The blank includes a first edge 62 which will provide the proximal end edge of the inner tube 12 and a second edge 64 which will provide the distal end edge of the inner tube. The blank also includes a third edge 66 which provides a leading edge of the blank 60 as it is wrapped around a mandrel, and a fourth edge 68 which provides a trailing edge.

The blank 60 is generally trapezoidal in shape, having first and second edges 62, 64 which are parallel, and third and fourth edges 66, 68 which are parallel. The hatched area denoted 69 is an area to which a bonding agent e.g. adhesive is applied as described below. The leading corner of the blank 60 is rounded. This may facilitate feeding of the blank around the inner tube in the process described without buckling it will be seen that the leading third edge 66 is a sloping edge, which defines an angle other than 90 degrees with both the first and second edges 62, 64. The trailing fourth edge 68 is likewise a sloping edge which defines an angle other than 90 degrees with both the first and second edges 62, 64.

Figure 7B:
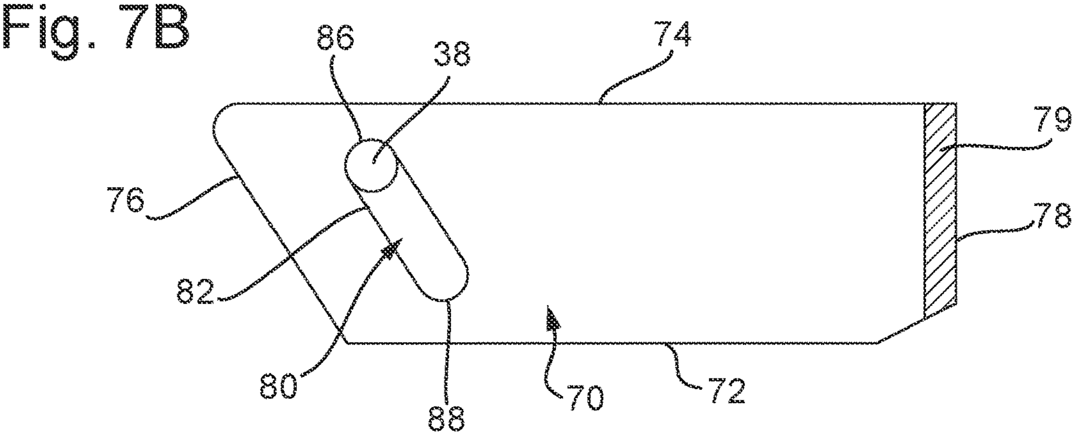
FIG. 7B illustrates a second blank for providing the product concealing tube and guide element of an embodiment of a dispenser in accordance with FIGS. 1-6B.

FIG. 7B illustrates a blank 70 in the flat for providing the product concealing tube 16 with the surface will define an outer surface of the product concealing tube uppermost. The blank includes a first edge 72 which will provide the proximal end edge of the product concealing tube 12 and a second edge 74 which will provide the distal or upper end edge of the product concealing tube.

The blank also includes a third edge 76 which provides a leading edge of the blank 70 as it is wrapped around a mandrel to provide the tube, and a fourth edge 78 which provides a trailing edge.

The first and second edges 72,74 of the blank 70 are generally parallel. The first edge 72 includes a first portion that is parallel to the second edge, and a second portion adjacent the fourth edge 78 which provides a chamfered edge, meeting the fourth edge 78 at an angle other than 90 degrees. A chamfered edge need not be provided, or if provided may be of a different extent or configuration to that shown (or may be associated alternatively or additionally with the second edge 74. The presence of a chamfered edge may help to reduce the amount of material present and may facilitate bonding of the blank into tubular form. However, it may be desirable to avoid providing a chamfer in a region to be printed and/or visible to a user. The region 79 is shaded to denote the region to which a bonding agent e.g. adhesive is applied to retain the wrapped tube in its wound configuration. A skived edge region of lower thickness may be provided in the vicinity of the trailing edge 78 to reduce the overall thickness of the tube in the region where the wound layers overlap. This may help to provide a flush appearance to the seam at the trailing edge 78.

The leading corner of the blank 70 is rounded. This may facilitate feeding of the blank around the inner tube in the process described without buckling. It will be seen that the leading third edge 76 is a sloping edge, which defines an angle other than 90 degrees with both the first and second edges 74, 72.

A slot 80 is provided in the blank 70, closer to the leading third edge 76 than the trailing fourth edge 78. The slot has parallel side edges 82, 84 and end edges 86, 88, which smoothly transition into the side edges. The end edges 86, 88 of the slot are spaced from the second and first edges 72, 74 of the blank 70 respectively. The side edges of the slot extend along a direction which is other than 90 degrees with respect to the first and second edges 72, 74. The longitudinal axis of the slot extends along the same direction. In this way, the slot will provide a helical recess on the interior surface of the product concealing tube formed by wrapping the blank 70 around a mandrel. The side edges of the recess will also extend along a helical path.

A guide element 38 in the form of a lug is provided at the end of the slot 80 which will be toward the distal end of the product concealing tube 16 once formed. The guide element 38 is frangibly connected to the periphery of the slot e.g. using frangible bridges. In the illustrated embodiment, the slot 80 has uniform width and the guide element 38 fits snugly within the slot. The guide element 38 will thus fit snugly within the slot throughout travel of the product concealing tube relative to the inner tube.

The blank 70 thus is a blank for providing the product concealing tube 16 and also the guide element 38.

Figure 7C:
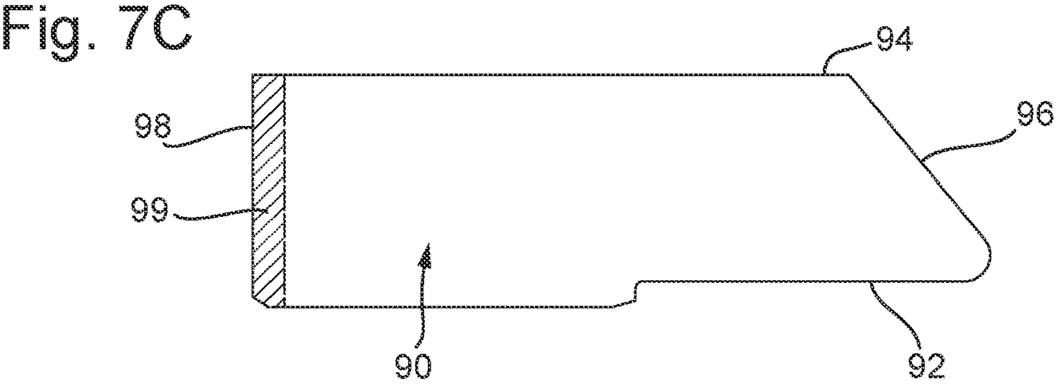
FIG. 7C illustrates a third blank for providing the outer tube of an embodiment of a dispenser in accordance with FIGS. 1-6B.

The blank 90 for providing the outer tube 16 is shown in FIG. 7C in the flat with the surface will define an outer surface of the outer tube uppermost. The blank includes a first edge 92 which will provide the proximal end edge of the outer tube 12 and a second edge 94 which will provide the distal or upper end edge of the outer tube. The blank also includes a third edge 96 which provides a leading edge of the blank 70 as it is wrapped around a mandrel to provide the tube, and a fourth edge 98 which provides a trailing edge.

The first and second edges 92, 94 of the blank 90 are generally parallel. However, the first edge 92 includes a step around half way along its length. This feature is optional, but is useful in the context of the illustrated embodiment in which the lower end of the outer tube is rolled inwardly. The recessed portion adjacent the third edge 96 means that the thickness of material to be rolled in at the end of the tube is reduced e.g. to one layer of material, corresponding to the outer winding of the blank.

The first edge 92 also includes a chamfered edge adjacent the fourth edge 98, meeting the fourth edge 98 at an angle other than 90 degrees. As described in relation to the product concealing tube, the presence of a chamfered edge is optional, and, where present, the degree of chamfer and extent of the chamfer may differ from that illustrated depending upon factors such as the extent of the area of the blank to be printed and/or visible. A chamfer might alternatively or additionally be provided at the other end of the trailing edge adjacent the second edge 94. Chamfering may be helpful in reducing the amount of material present where this is not detrimental to the appearance of the resulting tube or the bonding of the blank to provide the tube, and may facilitate in bonding of the blank in tubular form. The region 99 is shaded to denote the region to which a bonding agent e.g. adhesive is applied to retain the wrapped tube in its wound configuration. A skived edge region of lower thickness may be provided in the vicinity of the trailing edge 98 to reduce the overall thickness of the tube in the region where the wound layers overlap.

The leading corner of the blank 90 is rounded. This may facilitate feeding of the blank around the mandrel in the process described without buckling. It will be seen that the leading third edge 96 is a sloping edge, which defines an angle other than 90 degrees with both the first and second edges 92, 94.

Figure 7D:
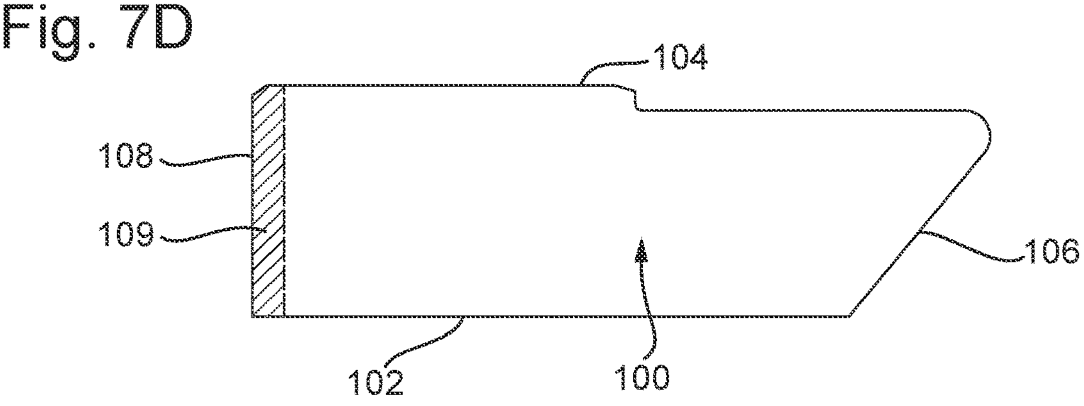
FIG. 7D illustrates a fourth blank for providing the cap of an embodiment of a dispenser n accordance with FIGS. 1-6B.

The blank 100 for providing the tubular cap 6 is shown in FIG. 7D in the flat with the surface will define an inner surface of the cap uppermost. The blank is of the same general shape as the blank 90 for providing the outer tube, but is a mirror image about the edge 94 of the blank 90. The blank 100 includes a first edge 102 which will provide the lower end edge of the cap 6 and a second edge 104 which will provide the upper end edge of the cap. The blank also includes a third edge 106 which provides a leading edge of the blank 100 as it is wrapped around a mandrel to provide the cap, and a fourth edge 108 which provides a trailing edge.

The first and second edges 102, 104 of the blank 100 are generally parallel. However, the second edge 104 includes a step around half way along its length. This feature is optional, but is useful in the context of the illustrated embodiment in which the upper end of the cap is rolled inwardly. The recessed portion adjacent the third edge 106 means that the thickness of material to be rolled in at the end of the tube is reduced e.g. to one layer of material, corresponding to the outer winding of the blank.

The second edge 104 also includes a chamfered edge adjacent the fourth edge 108, meeting the fourth edge 108 at an angle other than 90 degrees. As with the outer tube and product concealing tube, the presence or absence of a chamfer, the configuration of the chamfer and/or whether any additional chamfered edge is provided may be selected as desired depending on factors such as the visibility of the edge, the importance of reducing the amount of material etc. The region 109 is shaded to denote the region to which a bonding agent e.g. adhesive is applied to retain the wrapped tube in its wound configuration. A skived edge region of lower thickness may be provided in the vicinity of the trailing edge 108 to reduce the overall thickness of the tube in the region where the wound layers overlap.

The leading corner of the blank 106 is rounded. This may facilitate feeding of the blank around the mandrel in the process described without buckling. It will be seen that the leading third edge 106 is a sloping edge, which defines an angle other than 90 degrees with both the first and second edges 102, 104.

It will be appreciated that which of the first and second edges of the blank shown in FIG. 7A provides the proximal or distal edge of the resulting inner tube in use may vary from that illustrated. Similarly, whether the rounded leading edge of the blanks of FIGS. 7A-D is at the proximal or distal end of the resulting tube may differ from the arrangement illustrated. However, the guide element 38 should advantageously be frangibly connected to the end of the slot 80 which will be the distal end of the resulting recess in the formed tube, and the stepped edges of the blanks in FIGS. 7C and D should be located at the edge of the blank which is intended to be rolled inwardly if rolling is to be performed. If rolled edges are not used, the stepped edges may be omitted.

One method of forming the dispenser using the set of blanks shown in FIGS. 7A-D will now be described by reference to FIGS. 8A-E.

Figure 8A:
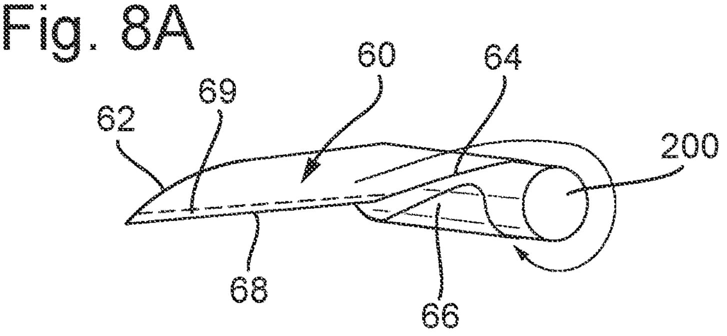
FIG. 8A illustrates a first step in a process of manufacturing the dispenser in accordance with the embodiment of FIGS. 1-6B involving wrapping the first blank of FIG. 7A around a mandrel to provide the inner tube.

In a first step shown in FIG. 8A, the first blank 60 is wrapped around a mandrel 200 rotating in the direction of the arrow in FIG. 8A with the third edge 66 leading in order to provide the inner tube 12. The wrapping process is performed such that the first and second edges 62, 64 of the first blank 60 are perpendicular to the axis of the mandrel.

A bonding agent e.g. adhesive is applied to the region 69 adjacent the fourth, trailing edge 68 on the surface which will form the interior of the inner tube prior to the blank being wound around the mandrel. In this way, the inner surface of the region 68 will become adhered to an adjacent inner winding of the inner tube to retain the tube in its wound configuration.

Figure 8B:
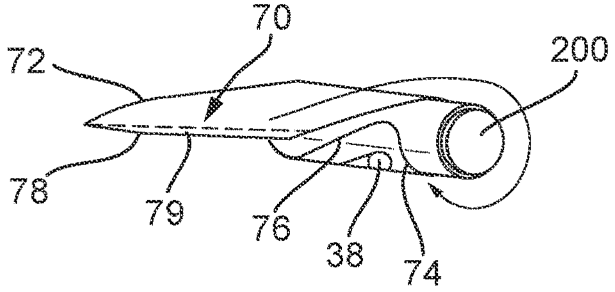
FIG. 8B illustrates a second step in a process of manufacturing the dispenser in accordance with the embodiment of FIGS. 1-6B involving wrapping the second blank of FIG. 7B around the inner tube to provide the product concealing tube.
Figure 8C:
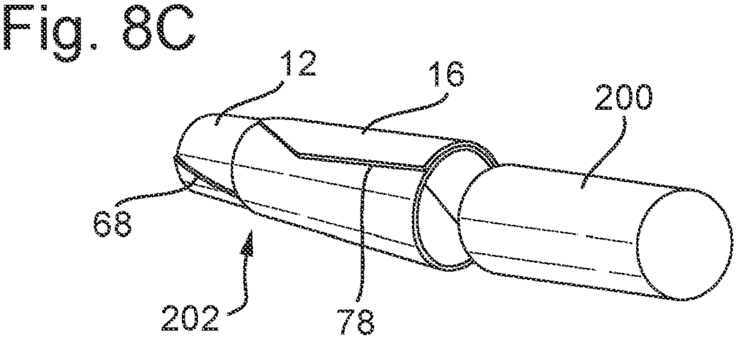
FIG. 8C illustrates a third step in a process of manufacturing the dispenser in accordance with the embodiment of FIGS. 1-6B involving removing the sub-assembly of the inner tube and product concealing tube from the mandrel.

In the second step shown in FIG. 8B, the second blank 70 is wrapped around the formed inner tube 12 produced in the first step of FIG. 8A while the inner tube 12 is still on the mandrel 200. The second blank 70 is wrapped around the inner tube 12 and the mandrel 200 while the mandrel is rotating in the direction of the arrow in FIG. 8B, with the third edge 76 leading in order to provide the product concealing tube 16. The wrapping process is performed such that the first and second edges 74, 72 of the second blank 70 are perpendicular to the axis of the mandrel.

A bonding agent e.g. adhesive is applied to the region 79 adjacent the fourth, trailing edge 78 on the surface which will form the interior of the product concealing tube prior to the blank being wound around the mandrel. In this way, the inner surface of the region 78 will become adhered to an adjacent inner winding of the product concealing tube to retain the tube in its wound configuration. A bonding agent e.g. adhesive is also applied to the inner surface of the guide element 38 of the blank 70 prior to the blank 70 being wrapped around the mandrel 200. In this way the guide element 38 becomes bonded to the exterior surface of the inner tube 12. The remainder of the internal surface of the blank 70 is left free of bonding agent e.g. adhesive such that the resulting product concealing tube 16 is attached to the inner tube 12 only via the guide element 38 (until such time as the frangible connection between the guide element 38 and the periphery of the slot 80 is broken). The guide element 38 remains within the slot 80 throughout the winding process, and subsequently, regardless of whether the frangible connection is broken. The slot 80 creates the recess 24 on the interior of the resulting product concealing tube. The slot 80 is covered by the outer winding of the blank such that the recess does not extend through the entire thickness of the wall of the product concealing tube.

As the guide element 38 is at the end of the slot 80 which is at the distal end of the resulting product concealing tube, when the guide element 38 become bonded to the inner tube, the product concealing tube will initially be in its most retracted position relative to the inner tube. This may help support the product concealing tube as it is formed. Thus the second blank 70 should be positioned relative to the first blank 60 so as to be in a position to result in the product concealing tube having a desired fully retracted position relative to the inner tube. The product concealing tube 16 will remain in this fully retracted position until the frangible connection of the guide element 38 to the slot 80 is broken to allow relative movement between the inner tube 12 and product concealing tube 16.

In other embodiments the product concealing tube might not necessarily be formed in its most retracted position. The relevant position will be determined by the position of the first and second blanks relative to one another during wrapping around the mandrel, and the position of the guide element 38 within the slot 80 when frangible connected thereto.

Figure 8D:
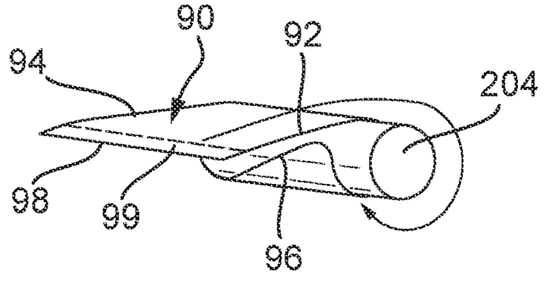
FIG. 8D illustrates a fourth step in a process of manufacturing the dispenser in accordance with the embodiment of FIGS. 1-6B involving wrapping the third blank of FIG. 7C around a mandrel to provide the outer tube.
Figure 8E:
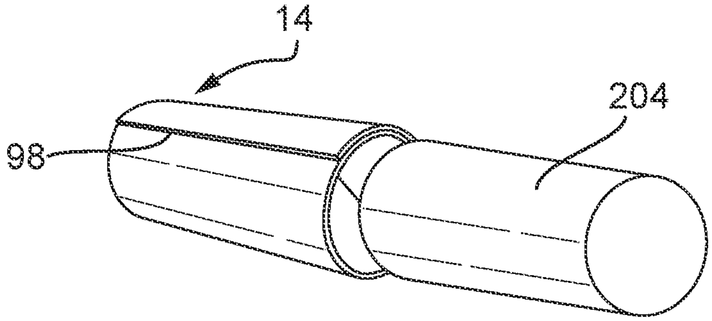
FIG. 8E illustrates a fifth step in a process of manufacturing the dispenser in accordance with the embodiment of FIGS. 1-6B involving removing the outer tube from the mandrel.

In the next step, FIG. 8D, the sub-assembly 202 of the product concealing tube 16 and inner tube 12 is removed from the mandrel 200. As illustrated, the frangible connection is broken during or prior to this step and the product concealing tube 16 moves toward its fully extended position relative to the inner tube 12 as the sub-assembly is removed from the mandrel 200. Advantageously the process is performed such that the frangible connection breaks during this step to permit movement of the product concealing tube relative to the inner tube, or previously during winding of the second blank to provide the product concealing tube (i.e. after the guide element 38 becomes bonded to the exterior of the inner tube). However, in other embodiments, if the frangible connection is not already broken to permit movement of the product concealing tube relative to the inner tube a specific subsequent step could be performed urging the product concealing tube 16 toward a more extended position relative to the inner tube 12 in order to break the frangible connection between the guide element 38 and slot 80. Such a step could be performed after step 8C and before assembly of the sub-assembly of the inner tube and product concealing tube with an outer tube as described below.

Of course, in yet other embodiments, it is envisaged that breakage of the frangible connection could occur at a later stage, even subsequent to assembly of the product concealing tube and inner tube with the outer tube e.g. upon insertion of a stick product or even upon first use of the product by a user. Such options may be more appropriate where the product concealing tube is not initially in a fully retracted position relative to the inner tube.

In the next step shown in FIG. 8D, the outer tube 14 is produced by wrapping the blank 90 around a second, larger diameter mandrel 204 while the mandrel rotates in the direction of the arrow in FIG. 8D, with the third edge 96 leading. The wrapping process is performed such that the first and second edges 92, 94 of the second blank 70 are perpendicular to the axis of the mandrel. A bonding agent e.g. adhesive is applied to the region 99 adjacent the fourth, trailing edge 98 on the surface which will form the interior of the outer tube prior to the blank being wound around the mandrel 204. In this way, the inner surface of the region 98 will become adhered to an adjacent inner winding of the outer tube to retain the tube in its wound configuration.

In the next step 8E the outer tube 14 is removed from the mandrel 204. As shown, the proximal end of the outer tube is to the right in FIG. 8D.

The proximal edge of the outer tube 14 is rolled inwardly to provide the lip 13. Any suitable technique may be used. As described earlier, due to the shape of the edge 92 of the blank 90, only a single ply of material need be rolled inwardly to create the lip, as the inner winding of the outer tube will be recessed from the proximal end due to the recessed portion of the edge 92. A closure disc 15 is then located on the lip to close the proximal end of the outer tube 14. The disc may be secured in place using a bonding agent e.g. adhesive.

Steps 8D and E are effectively repeated using the fourth blank 100 for providing the cap. Thus, in the next step (not shown) the tubular cap 6 is produced by wrapping the blank 100 around the second, larger diameter mandrel 204 while the mandrel rotates in the direction of the arrow in FIG. 8D, with the third edge 106 leading. A bonding agent e.g. adhesive is applied to the region 80 adjacent the fourth, trailing edge 108 on the surface which will form the interior of the cap prior to the blank being wound around the mandrel 204. In this way, the inner surface of the region 108 will become adhered to an adjacent inner winding of the cap to retain the tube in its wound configuration.

In the next step the cap 8 is removed from the mandrel 204.

The lower edge of the cap 6 is rolled inwardly to provide the lip 11. Any suitable technique may be used. As described earlier, due to the shape of the edge 104 of the blank 100, only a single ply of material need be rolled inwardly to create the lip, as the inner winding of the cap will be recessed from the upper end due to the recessed portion of the edge 102. A closure disc 10 is then located on the lip to close the upper end of the cap 6. The disc may be secured in place using a bonding agent e.g. adhesive.

It will be appreciated that the steps of forming the cap need not be carried out after forming the outer tube, and these steps may be carried out before, or at the same time as one another (with a different mandrel of the same diameter to mandrel 204 then being used). Likewise, it is not necessary that the sub-assembly of the inner tube and product concealing tube is necessarily produced before the outer tube and/or the cap. The sub-assembly may be produced subsequently or at the same time as the outer tube and/or cap.

Figure 8F:
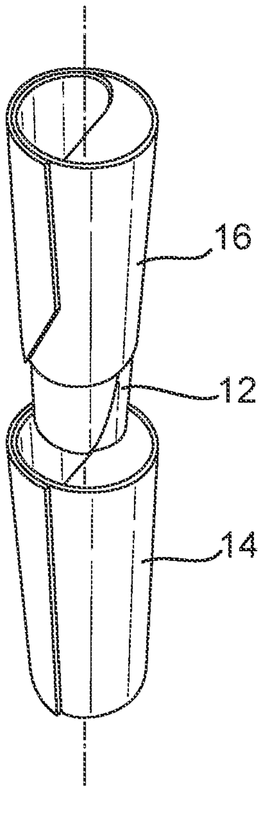
FIG. 8F illustrates a further step in the process of manufacturing the dispenser in accordance with the embodiment of FIGS. 1-6B involving inserting the inner tube and product concealing tube sub-assembly into the outer tube.

In the next step, shown in FIG. 8F, the sub-assembly of the inner tube 12 and product concealing tube 16 is located coaxially with the outer tube 14 and inserted into the base. The product concealing tube 16 remains in its fully extended position relative to the inner tube 12, by virtue of frictional engagement between the tubes and between the guide element 38 and edges of the slot. In other embodiments, as discussed above, the product concealing tube need not be in the fully extended position.

A bonding agent e.g. adhesive is applied to the lower end of the inner tube 12 before performing this step, so that when inserted into the outer tube so as to contact the closure disc 15 of the outer tube 14, the bottom of the inner tube 12 will become bonded to the closure disc of the outer tube 14, thereby fixing the inner tube 12 to the outer tube 14. The fixing of the outer tube and the inner tube to on another does not interfere with the ability of the product concealing tube 16 to slide in the space between the outer tube and inner tube (at least once the frangible connection of the guide element 38 to the periphery of the slot 80 is broken if this has not already occurred).

A product stick is disposed within the assembly of the product concealing tube, inner tube and outer tube such that it extends from the distal end of the inner tube and beyond the distal end of the product concealing tube when in the fully retracted position. The product stick may be affixed to the inner tube e.g. the distal end thereof in any suitable manner as described above. The product stick may be inserted into the distal end of the inner tube through the open end of the product concealing tube prior to or preferably after insertion of the product concealing tube and inner tube sub-assembly into the end of the outer tube in step 8F.

A cap, where provided, is then located over the distal end of the dispenser. The product concealing tube is typically in the fully extended position covering the product stick when the cap is applied, but this need not be so. Likewise, the cap may be provided before insertion of the product stick and subsequently removed to enable the stick to be inserted and then replaced.

Once the frangible connection between the guide element 38 and the periphery of the slot is broken, the product concealing tube 16 is free to move relative to the inner tube (and outer tube) between the fully extended and fully retracted positions defined by engagement between the guide element and the distal 27 and proximal 25 ends of the recess 24 provided by the slot 80 of the second blank 70 in the interior of the wound product concealing tube 16. This movement is as earlier described in relation to FIGS. 1-6B. In this embodiment, the guide element 38 is snugly received in the recess 24, and engages the side edges of the slot throughout the available range of relative movement.

As mentioned above, the frangible connection may be broken during the step of wrapping the second blank 70 around the mandrel 200 and/or during removal of the product concealing tube from the mandrel on which it is wound. Alternatively the frangible connection may be broken after production of the sub-assembly 202 of the inner tube 12 and product concealing tube 16. This may take place before or after assembly with the outer tube 14. This may be achieved by applying a suitable force acting to move the product concealing tube relative to the inner tube in the appropriate direction based on the initial position of the guide element within the slot. For example, in the illustrated embodiment, the position of the guide element 38 is at the upper, or distal end of the slot 80, such that the product concealing tube 16 is initially in its fully retracted position. The product concealing tube 16 may then be pulled apart from the inner tube in order to break the frangible connection.

In yet other embodiments, the frangible connection may be broken at the stage of insertion of a product stick, or even later, upon first use by a user. However, breaking of the frangible connection during manufacture of the dispenser, in particular during or prior to removal of the inner tube and product concealing tube sub-assembly from the mandrel is preferred. This may provide greater control over the breaking of the connection. The frangible connection may be designed to have a strength which is expected to result in it breaking during the desired part of the manufacturing process. For example, the number and strength of frangible bridges provided may be used to control the time of breaking of the connection. Breaking of the frangible connection between the guide element and periphery of the slot described herein refers to such breaking of the connection to permit relative movement of the product concealing tube and inner tube. References to the frangible connection being between the guide element and periphery of the slot do not imply that the connection is broken before the second blank is wrapped to form the product concealing tube. The slot is still present in the tube, but may then be referred to as the recess.

By providing the guide element as part of the second blank for the product concealing tube, being frangibly connected to the periphery of the slot, the method disclosed herein enables the dispenser to be provided without needing to provide an additional component bearing the guide element. The guide element is provided as part of the second blank, but becomes bonded to the inner tube as part of the same step in which the product concealing tube is wound. This results in a more streamlined process, with only one step being needed to both provide the guide element associated with the inner tube and also provide the product concealing tube.

The method may be performed so as to result in no more than two plies of material being present at any point in any of the formed tubes i.e. the inner tube, outer tube, product concealing tube, cap.

Figure 9A:
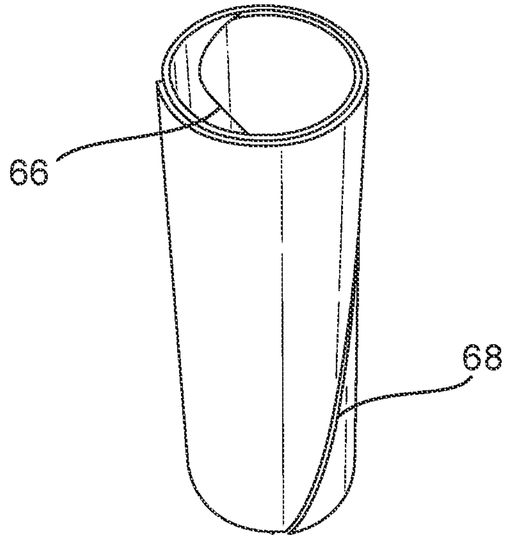
FIGS. 9A and B illustrate the resulting wound inner tube and product concealing tube respectively.
Figure 9B:
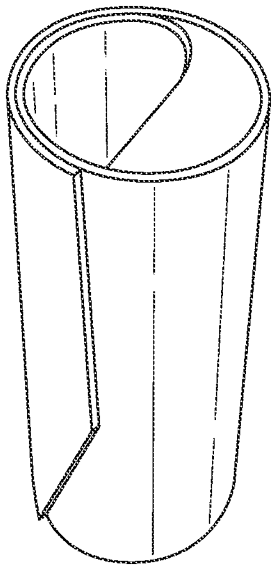

FIG. 9A illustrates the formed i.e. wound inner tube 12, and FIG. 9B illustrates the formed i.e. wound product concealing tube 16. The distal end of each tube is shown uppermost.

The sloping leading edge 66 of the first blank 60 shown in FIG. 7A results in the lap seam to the interior of the wound inner tube 12 extending along a helical path. In this way, the seam is spread over a greater distance than would be the case with a straight leading edge to the blank. This has been found to provide an improved tube with a rounder cross section than would be the case with a straight leading edge, which may result in a tube of tear drop shaped cross section. Similarly, the trailing edge 68 slopes, and provides a helical seam extending around the exterior of the inner tube.

FIG. 9B similarly shows the helical lap seam obtained on the interior of the product concealing tube by virtue of the sloping leading edge 76. In contrast, the exterior lap seam extends parallel to the axis of the tube, due to the straight trailing edge 78. This may maximise the available area for printing or other finishing, since this surface of the product concealing tube may be visible to the user, and it may be desirable to provide some aesthetic finish. Such concerns are less in the context of the inner tube, which is not generally visible to the user. However, in alternative embodiments, a sloping trailing edge may alternatively be provided for the product concealing tube where the functional benefit of the resulting lap seam shape is of greater importance than aesthetic considerations.

The sloping leading edges of the third and fourth blanks 90, 100 similarly provide improved shape properties to the resulting outer tube and cap. Again, for these components, the trailing edge is shown as straight, to maximise area for printing etc., but this need not be the case.

The shapes of the blanks shown in FIGS. 7A-D are only exemplary.

Figure 10:
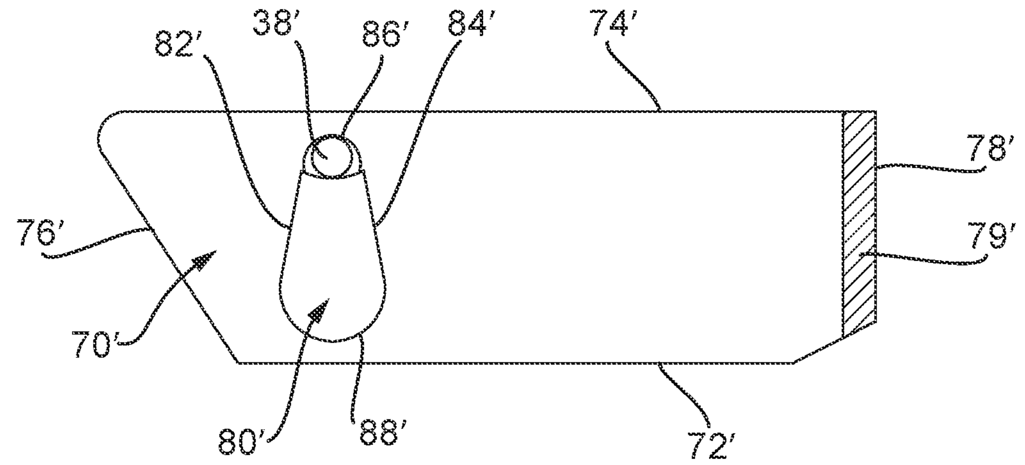
FIG. 10 illustrates an alternative embodiment of the second blank for providing the product concealing tube and guide element.

Some alternative configurations of the second blank for providing the product concealing tube 16 will now be described. As shown in FIG. 10, an alternative embodiment of the blank 70' includes similar features to those of the blank 70, and such features will be denoted using corresponding reference numerals annotated by "'". Only the significant differences will be described.

The slot 80' in this further embodiment has sidewalls 82', 84' which diverge from one another with distance from an end 86' of the slot, providing a wedge shaped slot. In this case, the wedge shaped slot has a teardrop shape. However, other forms are possible, such as a more triangular shape. The end 86' of the slot will be located to the distal end of the product concealing tube, such that the product concealing tube will be in its most retracted position relative to the inner tube when the product concealing tube is wound around the inner tube.

The guide element 38' is again in the shape of a lug, and located at the end 86', being frangibly connected to the periphery of the slot at that end. This shape of slot will result in a recess in the interior of the resulting product concealing tube that does not have an axis extending along a helical path, but does have side edges corresponding to the side edges 82', 84' which extend along helical paths. Thus, once the frangible connection between the guide element 38' and the slot 80' is broken, the product concealing tube may move along a helical path with respect to the inner tube with the movement being guided by the cooperation of the guide element and the periphery of the slot. In this case, movement of the product concealing tube relative to the inner tube is possible in various manners, including both axial and radial movement, with the extent and direction of the relative movement possible being constrained by engagement of the guide element 38' with the periphery of the slot i.e. recess in the product concealing tube. In this embodiment, engagement between the guide element and the periphery of the slot does not necessarily dictate the path of the movement of the product concealing tube relative to the inner tube but limits the range of such movement possible.

This configuration of slot has been found to be particularly advantageous in the context of the method described herein, facilitating wrapping of the blank 70' about the mandrel to provide the product concealing tube, but with the guide element still remaining within the slot, and with reduced tendency to jump over the edges of the slot. Where the frangible connection breaks during winding of the product concealing tube it may be helpful to enable some lateral movement of the guide element within the slot. Furthermore, providing a greater range of possible movement of the product concealing tube relative to the inner tube may facilitate use of the dispenser, enabling the user to "wiggle" the product concealing tube relative to the inner tube (i.e. by grasping the outer tube and moving the product concealing tube) to help move the product concealing tube. This may be useful were the product concealing tube is held by a relatively tight friction fit between the outer tube and inner tube, for example. While the user may twist the product concealing tube relative to the outer tube such that the relative movement follows a helical path e.g. with the guide element 38' engaging one of the side edges of the slot, this need not be the case, and the user might use a linear motion or indeed some other movement to advance or retract the product concealing tube e.g. zigzagging provided the guide element remains within the slot.

Production of a dispenser including a product concealing tube obtained from the blank shown in FIG. 10 is as described in relation to FIGS. 8A-8F, with the blank 70' substituted for the blank 70. As the blank 70' is wound around the mandrel 200 to provide the product concealing tube, the guide element becomes bonded to the outer surface of the inner tube as previously described.

Figure 11:
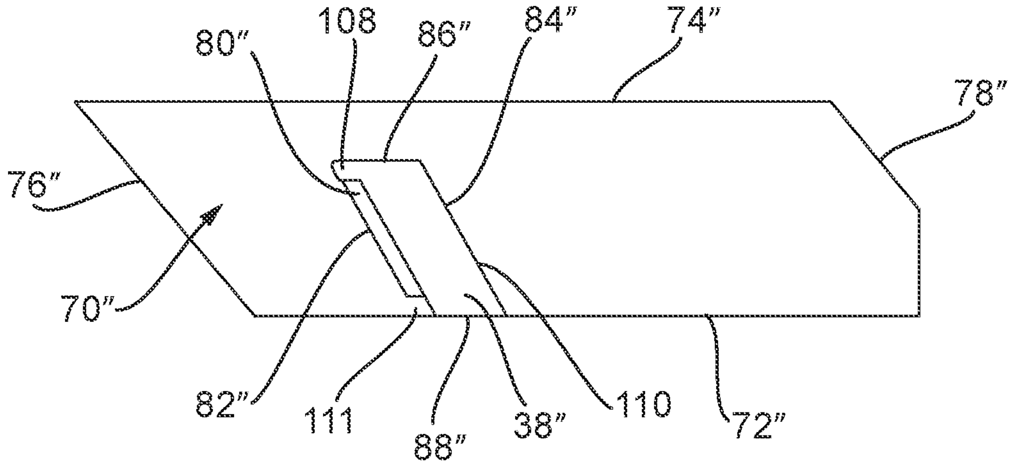
FIG. 11 illustrates yet another embodiment of the second blank for providing the product concealing tube and guide element.

FIG. 11 shows another alternative configuration of a second blank for providing the product concealing tube 16. As shown in FIG. 11, the alternative embodiment of the blank 70" includes similar features to those of the blank 70, and such features will be denoted using corresponding reference numerals annotated by """. Only the significant differences will be described.

The slot 80" includes an end 86" which will be at the distal end of the product concealing tube. However, at the opposite end the slot extends to the first edge 72" of the blank 70" which will be at the proximal end of the resulting tube. An elongate guide element 38" is provided in the slot, being frangibly connected to the periphery thereof in the position shown.

Production of a dispenser including a product concealing tube obtained from the blank shown in FIG. 11 is as described in relation to FIGS. 8A-8F, with the blank 70" substituted for the blank 70. As the blank 70" is wound around the mandrel 200 to provide the product concealing tube, the guide element becomes bonded to the outer surface of the inner tube as previously described.

Cooperating stop tabs 108, 111 associated with the distal end of the guide member and the proximal, open end 88" of the slot respectively form a stop mechanism to ensure the guide element remains within the slot once the frangible connection is broken, and engage one another to define a fully extended position of the product concealing tube relative to the inner tube in the dispenser. Other arrangements might be envisaged e.g. including pairs of cooperating stop tabs on each side of the guide element. However, the illustrated embodiment in which a single tab 111 is provided on one side of the slot with a cooperating single tab 108 on the guide element 38" may be advantageous in allowing an edge 110 of the guide element 38" to run along and engage the opposed edge 84" of the slot along the entire length thereof, assisting in guidance.

The shape of the blank 70" differs slightly from that of blanks 70 and 70'. While the sloping leading edge 76" is present, no rounded corner is provided, and the shape of the trailing edge differs from that of the previous embodiments. Any of the shapes or parts thereof for the contour of the second blank 70, 70' or 70" may be used interchangeably, depending upon the particular attributes of the product concealing tube required e.g. location of any printing, amount of material to be present etc. Other shapes may be used for any of the blanks described without departure from the invention as described herein. However, the use of the sloping leading edge at least is advantageous as described.

The blanks 70', 70" are each provided by a single piece of card or paper based material e.g. paperboard or cardboard as in the earlier embodiment.

The dispensers described herein may be provided in an outer package e.g. outer carton, which may be of paperboard or cardboard material.

It will be appreciated that various modifications may be made to the embodiments described herein. In particular, the shape of the guide element and the slot may vary from the examples illustrated. While embodiments have been illustrated in which the slot has a width similar to that of the guide element at one end, whether or not the side edges of the slot then diverge or run parallel, this need not necessarily be the case, particularly where a frangible connection is provided between the slot and guide element. However, a slot width closer to that of the guide element where the guide element is disposed may be useful in facilitating handling of the second blank, and controlling the position of the guide element even if a frangible connection is not provided or has broken.

Furthermore, while the invention has been illustrated by reference to the case in which a frangible connection is provided between the guide element and the periphery of the slot in the second blank, it is envisaged that such a connection may be omitted. For example, the guide element may be held within the slot to the degree necessary to allow handling of the second blank to form the product concealing tube with the guide element becoming bonded to the outer surface of the inner tube by virtue of a frictional engagement between the edges of the guide element and slot.

However, the use of a frangible connection is advantageous to facilitate handling of the blank and its use to provide the product concealing tube as described herein.

It is believed that a dispenser of the construction resulting from the method described herein, i.e. with a guide element bonded to the exterior of an inner tube, is advantageous in its own right. Thus, in further aspects, the invention extends to a dispenser for a product in stick form, and including an inner tube and a product concealing tube disposed outwardly of the inner tube, wherein the product concealing tube is retractable and extendable relative to the inner tube for exposing and covering a product stick extending from a distal end of the inner tube in use. The product concealing tube comprises a recess in an interior surface thereof and the inner tube comprises a guide element bonded to an exterior surface thereof, the product concealing tube being movable relative to the inner tube with the guide element cooperating with the recess for guiding the movement of the product concealing tube relative to the inner tube. In these further aspects, it is envisaged that the inner tube and product concealing tube might each be provided by a conventional spiral wound tube. The guide element may then be bonded to the exterior of the inner tube, and the recess machined into the interior of the outer tube to provide a dispenser functioning in the same manner as the dispenser obtained in accordance with the methods described herein. Such dispensers are advantageous in that by bonding the guide element to the exterior of the inner tube the number of components needed is minimised. A wider range of slot and guide element shapes may be envisaged where the dispenser is not formed using the methods described above i.e. with the guide element initially forming part of the second blank. A recess having side edges which diverge one another, i.e. of the shape shown in FIG. 10, may also be advantageous in the context of such a dispenser formed by other methods, facilitating operation of the dispenser, and providing greater latitude in the available movement between the product concealing tube and inner tube to extend and retract the product concealing tube relative to the inner tube.

The invention claimed is:

1. A method of manufacturing a dispenser for a product in stick form, the dispenser comprising an inner tube and a product concealing tube disposed outwardly of the inner tube, wherein the product concealing tube comprises an interior surface and is retractable and extendable relative to the inner tube for exposing and covering a product stick extending from a distal end of the inner tube in use;

the method comprising:

providing a first blank of sheet material for providing the inner tube of the dispenser;

wrapping the first blank around a mandrel to provide the inner tube of the dispenser;

providing a second blank of sheet material for providing the product concealing tube of the dispenser, wherein the second blank comprises a slot, and a guide element disposed within the slot;

applying a bonding agent to the second blank in a region corresponding to a surface of the guide element;

wrapping the second blank around the inner tube while the inner tube is held on the mandrel to provide the product concealing tube, with the surface of the guide element to which bonding agent has been applied facing the inner tube, such that the guide element becomes bonded to an exterior surface of the inner tube, wherein the slot provides a recess in the interior surface of the formed product concealing tube;

wherein, in use, the product concealing tube is movable relative to the inner tube with the guide element cooperating with the recess for guiding the movement of the product concealing tube relative to the inner tube.

2. The method of claim 1 wherein the product concealing tube is slidably and rotatably movable relative to the inner tube along a helical path with the guide element cooperating with the recess for guiding the movement of the product concealing tube relative to the inner tube.

3. The method of claim 1 wherein the second blank is positioned relative to the inner tube during the wrapping of the second blank around the inner tube such that the product concealing tube once formed is in a position relative to the inner tube which corresponds to a fully retracted position of the product concealing tube relative to the inner tube in the dispenser, the fully retracted position of the product concealing tube in the dispenser being the most retracted position of the product concealing tube relative to the inner tube.

4. The method of claim 1 wherein the first and second blanks are each single piece blanks.

5. The method of claim 1 wherein the second blank of sheet material is wrapped around the inner tube to provide the product concealing tube while the inner tube is still located on the mandrel.

6. The method of claim 1 wherein the guide element cooperates with the recess to define fully retracted and fully extended positions of the product concealing tube relative to the inner tube, wherein the fully retracted and fully extended positions of the product concealing tube relative to the inner tube correspond to positions in which the guide element abuts respective ones of opposed end edges of the recess defined by the slot in the product concealing tube so as to act as a stop preventing further movement of the product concealing tube relative to the inner tube in a given direction.

7. The method of claim 1 wherein the first blank comprises first and second opposed edges for providing proximal and distal end edges of the inner tube, the first and second edges being connected at their respective ends by opposed third and fourth edges, wherein the third edge provides a leading edge of the first blank as it is wrapped around the mandrel to provide the inner tube, and the fourth edge provides a trailing edge of the first blank, wherein the third edge is connected to the first edge so as to define an angle other than 90 degrees with the first edge and is connected to the second edge so as to define an angle other than 90 degrees with the second edge so as to provide a sloping leading edge of the first blank, wherein the first blank is shaped as a parallelogram comprising first and second pairs of parallel edges, wherein the parallelogram is not a square or rectangle.

8. The method of claim 1 wherein the slot in the second blank is configured such that, once the second blank has been wrapped around the inner tube to provide the product concealing tube, each side edge of the recess provided by the slot extends along a helical path.

9. The method of claim 1 wherein the recess extends only partially through the product concealing tube, wherein the second blank is wrapped around the inner tube to provide the product concealing tube in a manner such that the slot in the second blank is covered by an outer winding of the second blank.

10. The method of claim 1 wherein the guide element is disposed at one end of the slot in the second blank.

11. The method of claim 1 wherein side edges of the slot extend parallel to one another, and a greatest width of the guide element corresponds to a width of the slot, wherein the guide element is snugly received between side edges of the recess provided by the slot along an entire extent of relative movement between the product concealing tube and the inner tube provided by the guide element cooperating with the recess.

12. The method of claim 1 wherein side edges of the slot diverge from one another along at least a portion of each of the side edges.

13. The method of claim 1 wherein the slot comprises side edges and opposed end edges, the end edges being spaced from edges of the second blank which provide proximal and distal end edges of the product concealing tube.

14. The method of claim 1 wherein the slot extends to an edge of the second blank which provides a proximal end edge of the product concealing tube, and wherein the second blank comprises formations for providing a stop mechanism which prevents the product concealing tube from being completely removed from the inner tube in the dispenser.

15. The method of claim 1 wherein the guide element comprises a lug.

16. The method of claim 1 wherein the guide element is elongate.

17. The method of claim 1 wherein, in the second blank, the guide element is connected to a periphery of the slot via a frangible connection.

18. The method of claim 17, further comprising: removing a sub-assembly comprising the inner tube and the product concealing tube from the mandrel around which the second blank was wrapped to provide the product concealing tube, wherein the frangible connection is broken during or prior to the removing of the sub-assembly from the mandrel around which the second blank was wrapped to provide the product concealing tube.

19. The method of claim 1 wherein the first and second blanks are each blanks comprising card-based or paper-based material.

20. The method of claim 1, further comprising fixing an outer tube relative to the inner tube such that the product concealing tube is located between the inner tube and the outer tube.

21. The method of claim 20 wherein the outer tube is fixed relative to the inner tube using a base component at a proximal end of the dispenser.

22. A dispenser for a product in stick form, the dispenser comprising:

an inner tube formed from a first blank, the inner tube having been formed by wrapping the first blank around a mandrel; and a product concealing tube formed from a second blank comprising a slot and a guide element disposed within the slot, wherein the product concealing tube comprises a recess, provided by the slot, in an interior surface thereof, wherein the guide element is bonded to an exterior surface of the inner tube by a bonding agent applied to the second blank in a region corresponding to a surface of the guide element, the product concealing tube having been formed by wrapping the second blank around the inner tube while the inner tube is held on the mandrel, such that the product concealing tube is disposed outwardly of the inner tube with the surface to which the bonding agent has been applied facing the inner tube, and wherein the product concealing tube is retractable and extendable relative to the inner tube for exposing and covering the product extending from a distal end of the inner tube in use.

23. The dispenser of claim 22, further comprising an outer tube, wherein the product concealing tube is located between the inner tube and the outer tube, and the outer tube is fixed relative to the inner tube.

24. The dispenser of claim 22, wherein the recess does not extend entirely through the product concealing tube.

25. The dispenser of claim 22, wherein the product concealing tube is slidably and rotatably movable relative to the inner tube along a helical path with the guide element cooperating with the recess for guiding the movement of the product concealing tube relative to the inner tube.

* * * * *